United States Patent [19]
Maruyama et al.

[11] Patent Number: 5,448,412
[45] Date of Patent: Sep. 5, 1995

[54] TELEPHOTO ZOOM LENS SYSTEM

[75] Inventors: Koichi Maruyama; Jun Hirakawa, both of Tokyo, Japan

[73] Assignee: Asahi Kogaku Kogyo Kabushiki Kaisha, Tokyo, Japan

[21] Appl. No.: 87,897

[22] Filed: Jul. 9, 1993

[30] Foreign Application Priority Data

Jul. 13, 1992 [JP] Japan ................. 4-185157

[51] Int. Cl.$^6$ ............................. G02B 15/14
[52] U.S. Cl. .................. 359/687; 359/683; 359/684; 359/691
[58] Field of Search ........... 359/686, 691, 692, 689, 359/684, 683, 687

[56] References Cited

U.S. PATENT DOCUMENTS

| | | | |
|---|---|---|---|
| 4,468,097 | 8/1984 | Hamanishi | 359/682 |
| 4,848,883 | 7/1989 | Maruyama | 359/684 |
| 4,948,234 | 8/1990 | Mihara | 359/688 |
| 5,144,489 | 9/1992 | Shibayama | 359/689 |
| 5,159,493 | 10/1992 | Tsutsumi | 359/689 |
| 5,272,564 | 12/1993 | Suzuki et al. | 359/686 |
| 5,321,554 | 6/1994 | Ishiyama et al. | 359/689 |

FOREIGN PATENT DOCUMENTS 63-58324 11/1988 Japan.
4-1328 1/1992 Japan.
4-191811 7/1992 Japan.

Primary Examiner—Georgia Y. Epps
Assistant Examiner—Michael A. Papalas
Attorney, Agent, or Firm—Sughrue, Mion, Zinn, Macpeak & Seas

[57] ABSTRACT

A telephoto zoom lens system is disclosed in which the wide-angle end starts with the middle telephoto range and in which focusing is done by means of a lighter focusing lens group than what is used in the method of focusing by advancing the front lens component and that only small aberrational variations occur even if zooming is done up to the closest focusing distance. The telephoto zoom lens system includes a front lens component and a rear lens component, said front lens component comprising a front lens group and having, in order from the object side, a positive first sub-group 1a and a positive second sub-group 1b and having an overall positive power. The first sub-group 1a is such that a negative meniscus lens having a convex surface directed towards the object is located closest to the image plane, and the rear lens component is located closer to the image plane than the front lens component and having a zooming capability, focusing for the object being effected by moving only the second sub-group 1b towards the object when it is positioned at near distance.

14 Claims, 18 Drawing Sheets

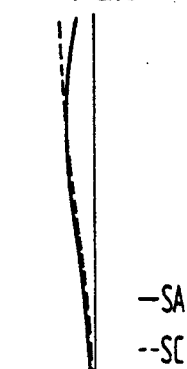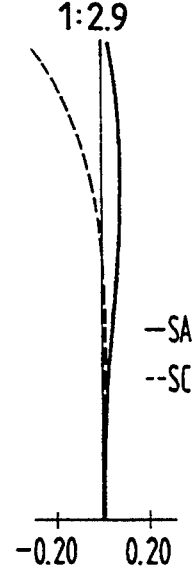
FIG. 3A 1:2.8 SPHERICAL ABERRATION SINE CONDITION
FIG. 3B 1:2.8 SPHERICAL ABERRATION CHROMATIC ABERRATION
FIG. 3C W=15.6° LATERAL CHROMATIC ABERRATION
FIG. 3D W=15.6° ASTIGMATISM
FIG. 3E W=15.6° DISTORTION
FIG. 4A 1:2.9 SPHERICAL ABERRATION SINE CONDITION
FIG. 4B 1:2.9 SPHERICAL ABERRATION CHROMATIC ABERRATION
FIG. 4C W=6.1° LATERAL CHROMATIC ABERRATION
FIG. 4D W=6.1° ASTIGMATISM
FIG. 4E W=6.1° DISTORTION

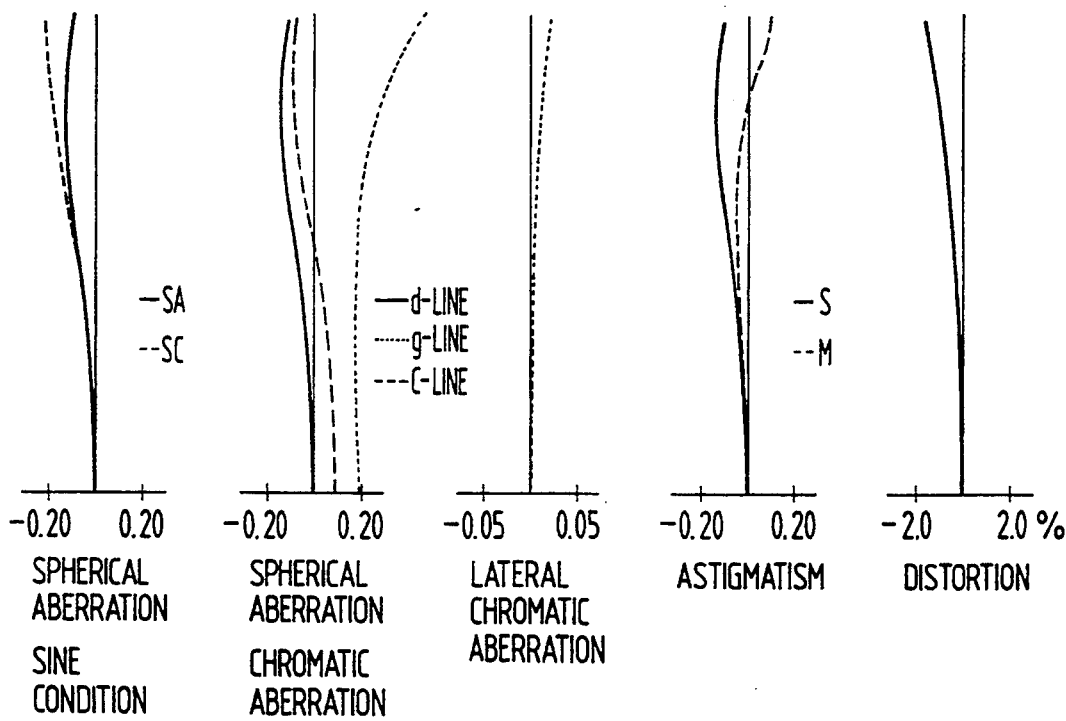
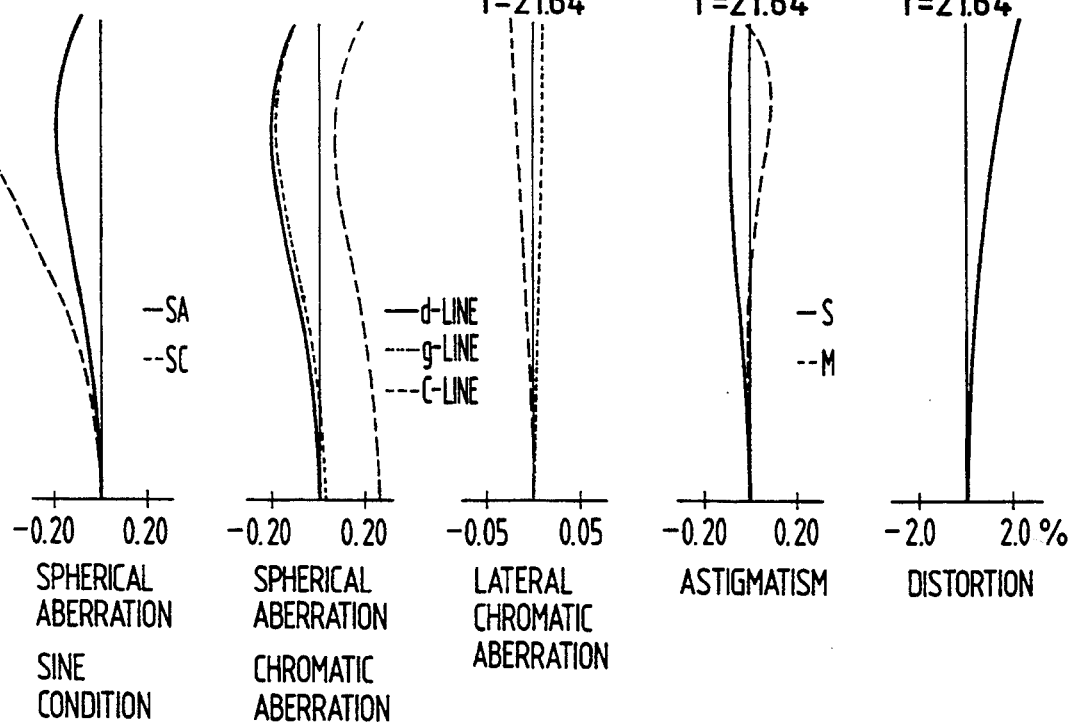

FIG. 7
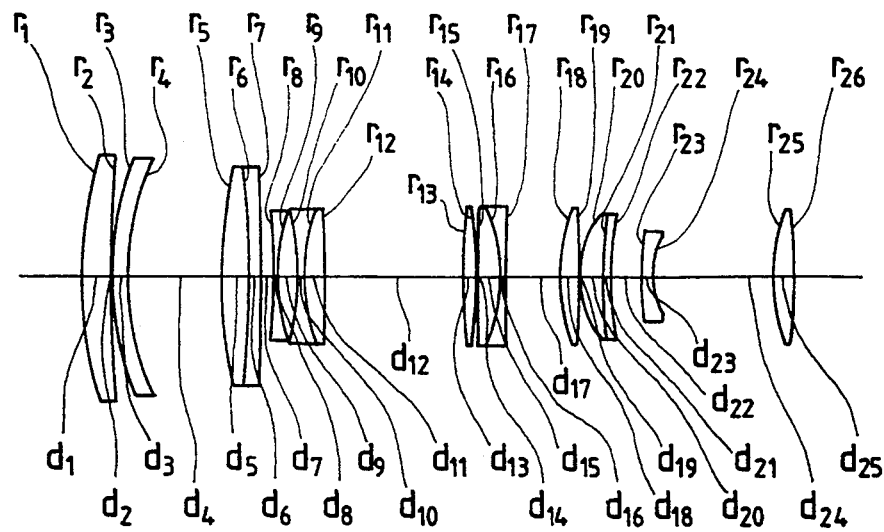
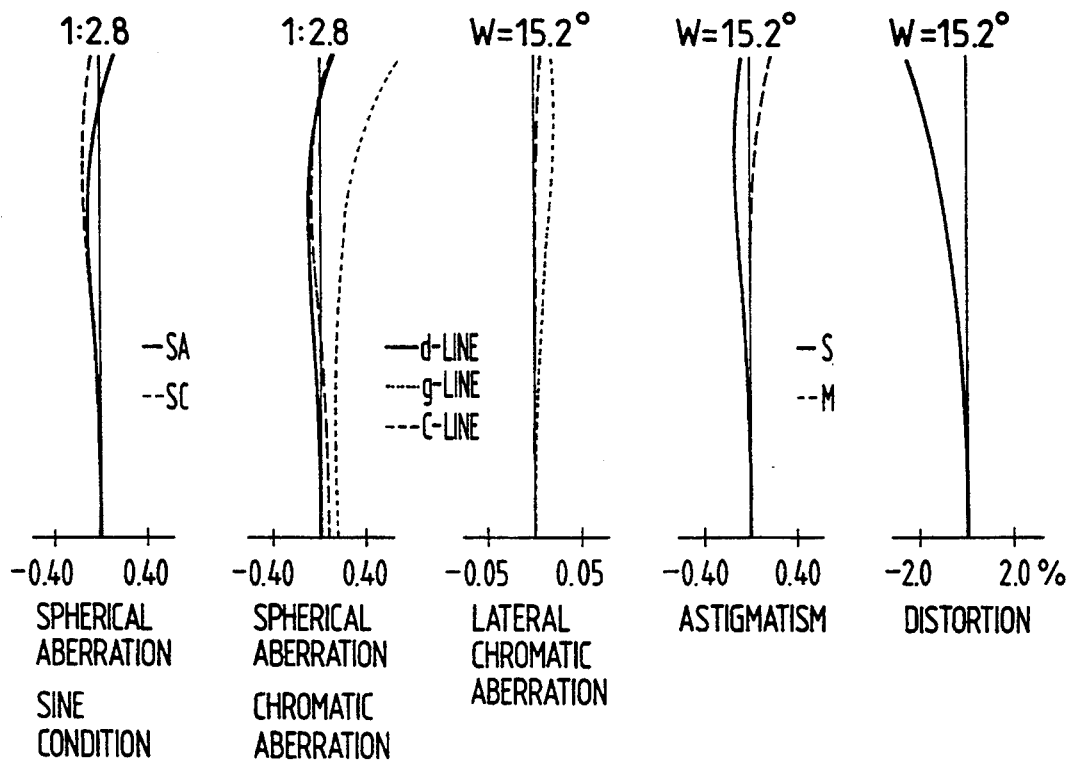

FIG. 9A  FIG. 9B  FIG. 9C  FIG. 9D  FIG. 9E
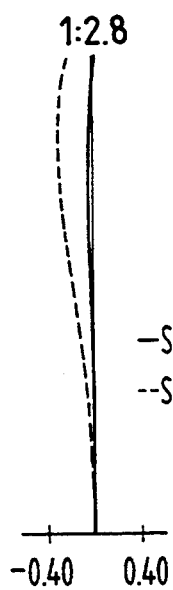
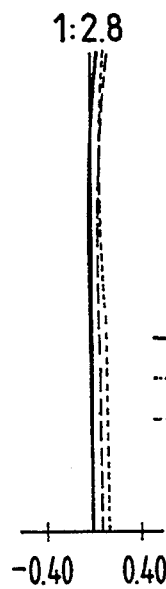
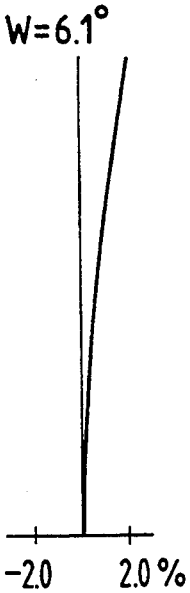
FIG. 10A  FIG. 10B  FIG. 10C  FIG. 10D  FIG. 10E
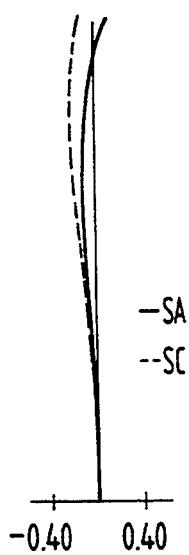
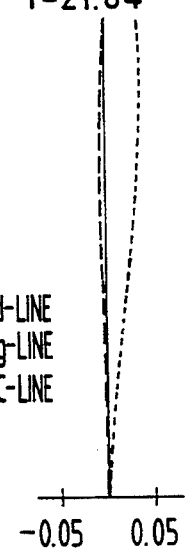
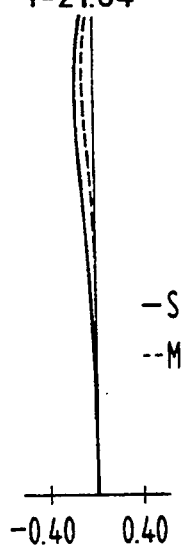

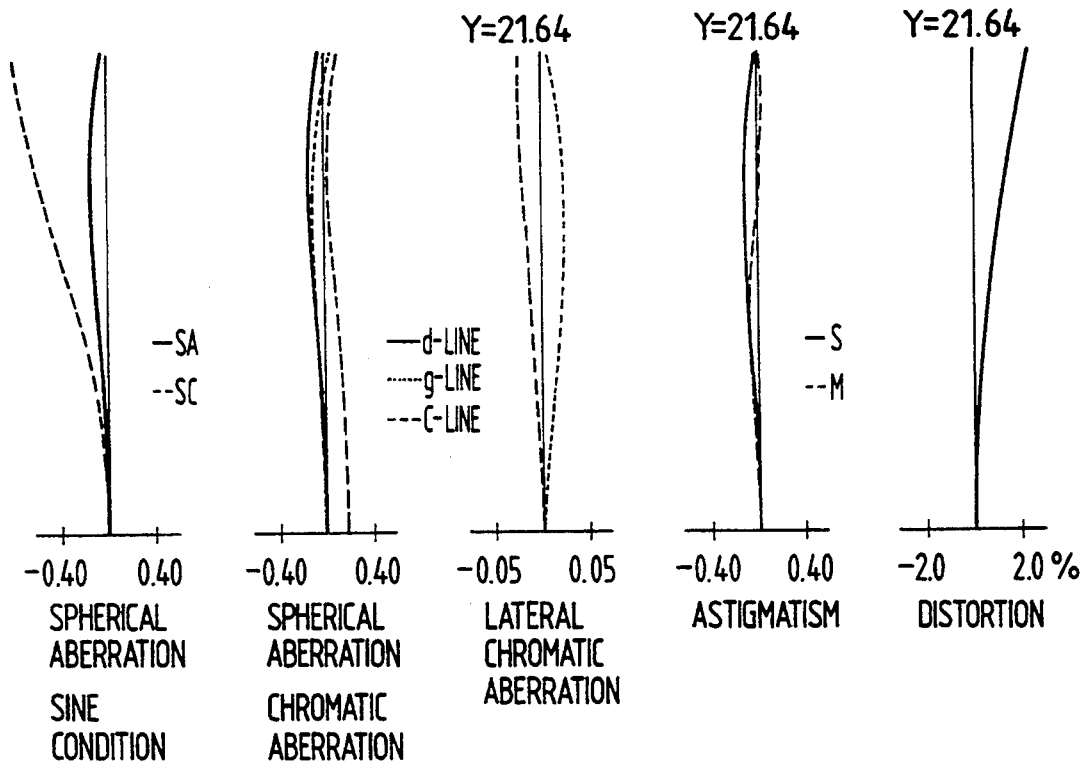
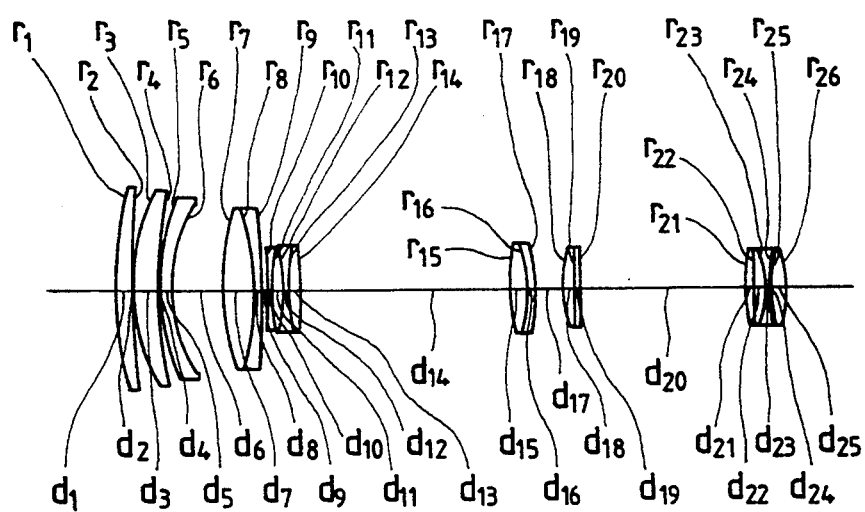

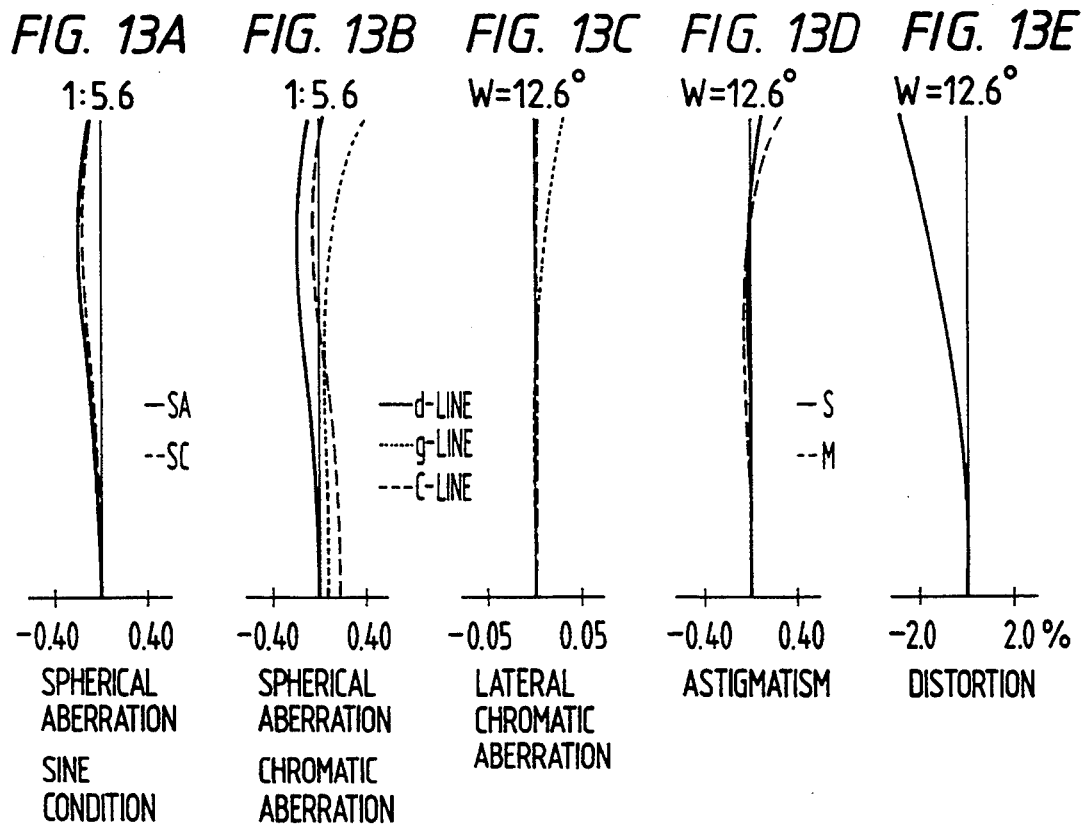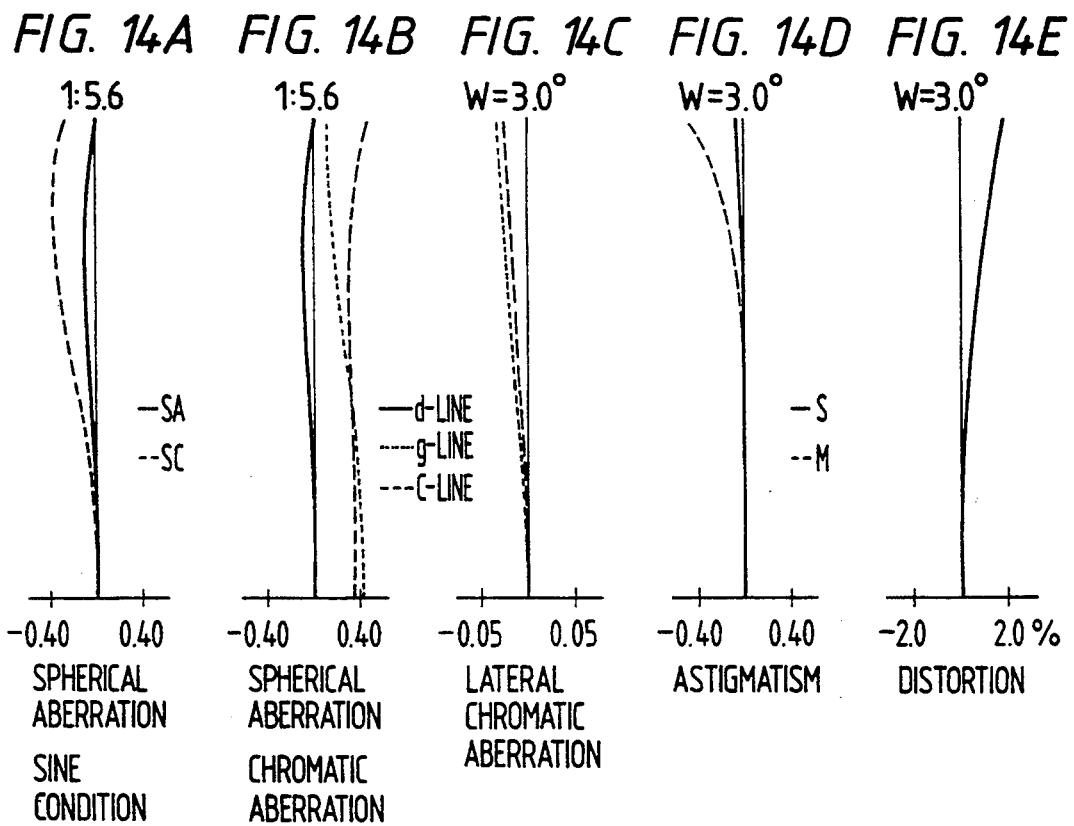

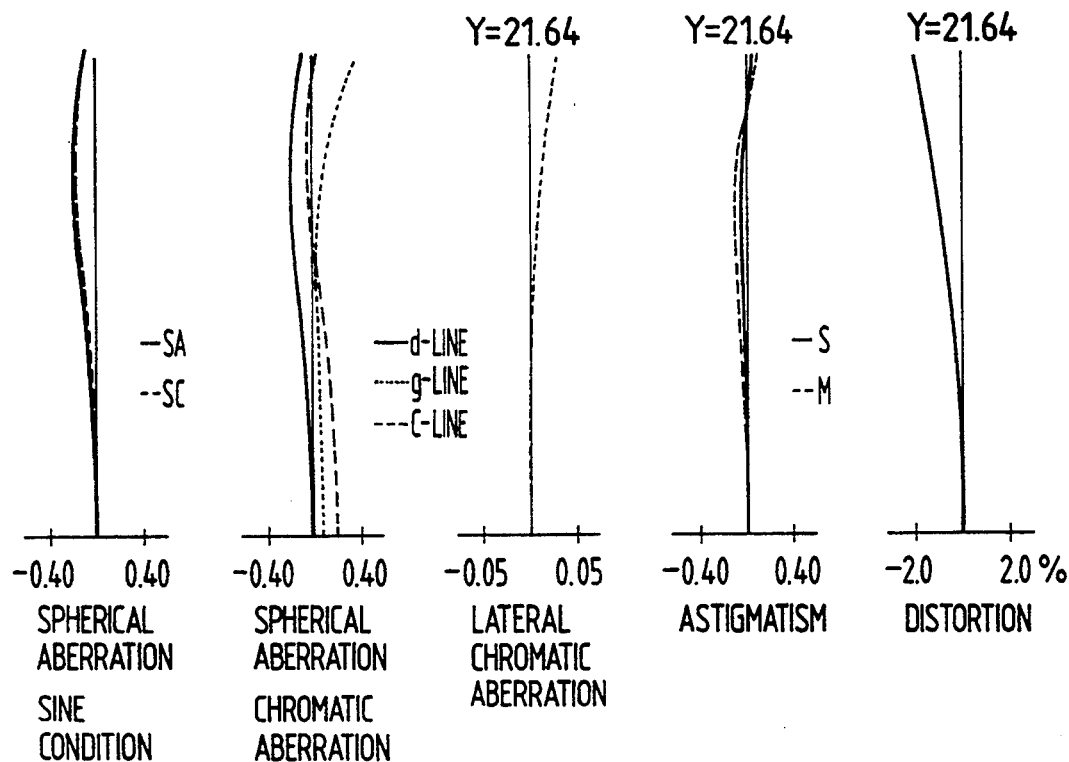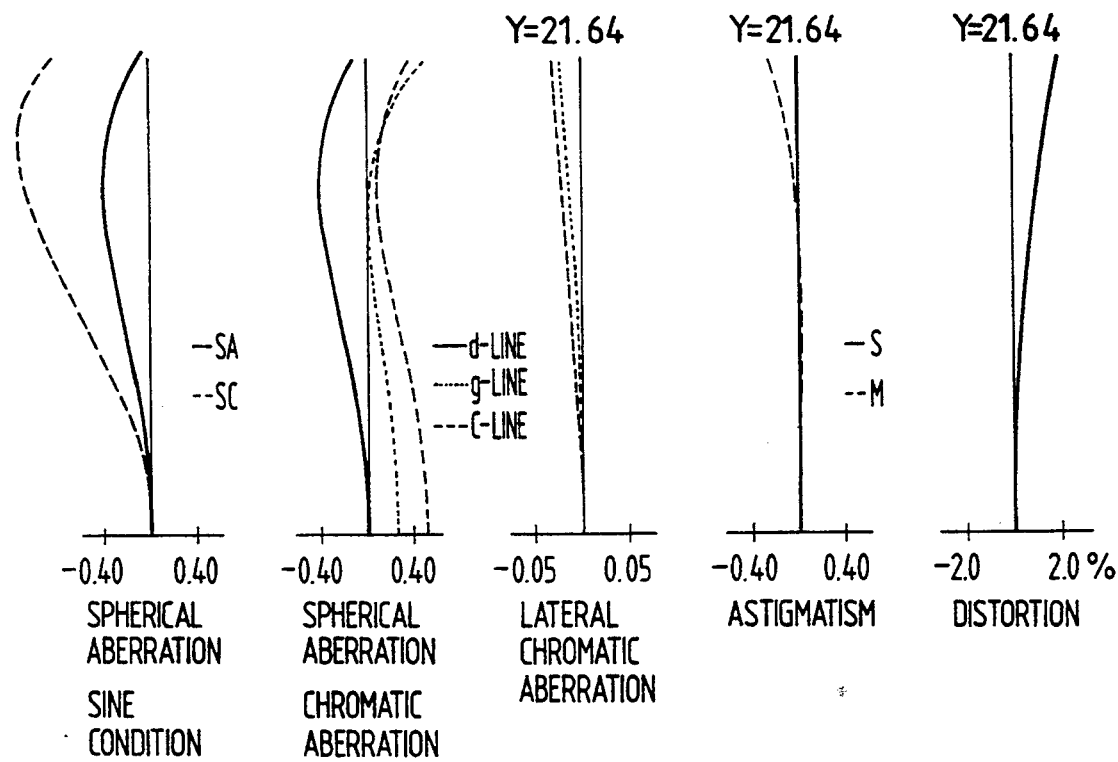

FIG. 17
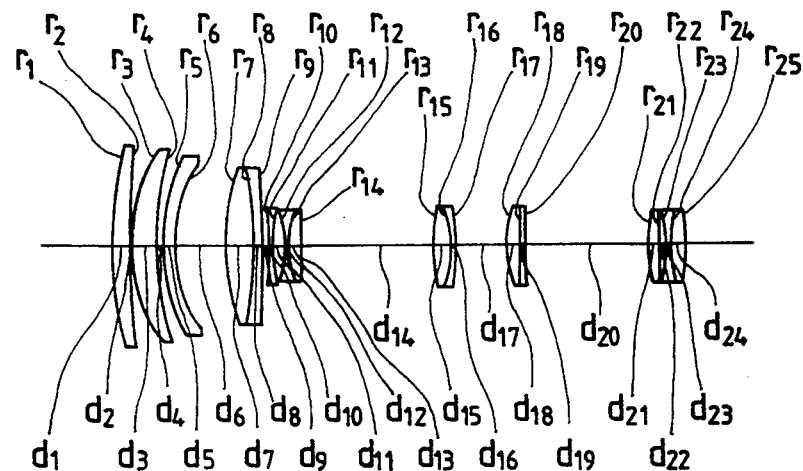
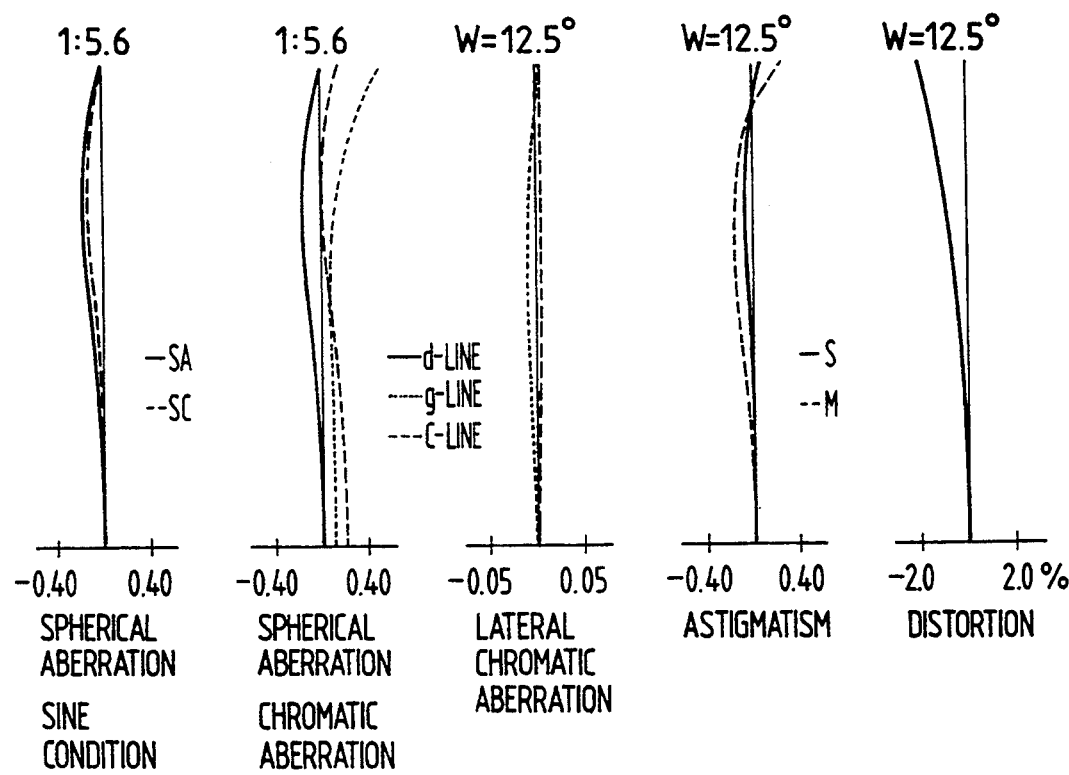
FIG. 18A  FIG. 18B  FIG. 18C  FIG. 18D  FIG. 18E
1:5.6  1:5.6  W=12.5°  W=12.5°  W=12.5°
SPHERICAL ABERRATION SINE CONDITION
SPHERICAL ABERRATION CHROMATIC ABERRATION
LATERAL CHROMATIC ABERRATION
ASTIGMATISM
DISTORTION

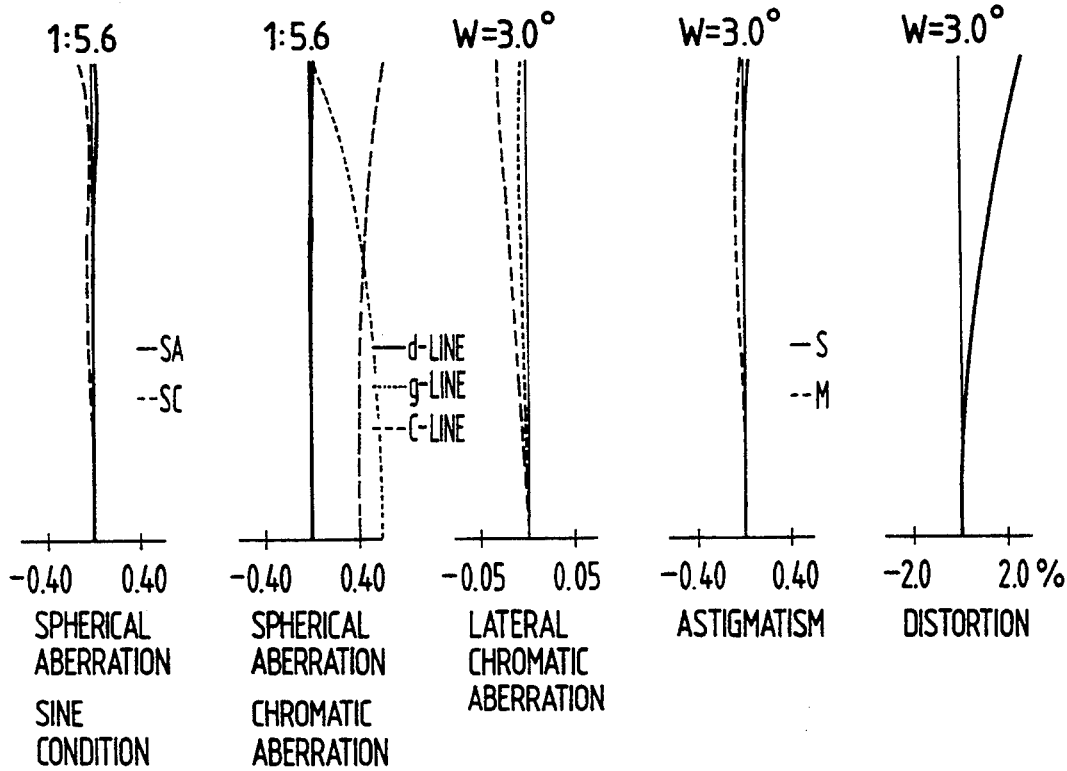
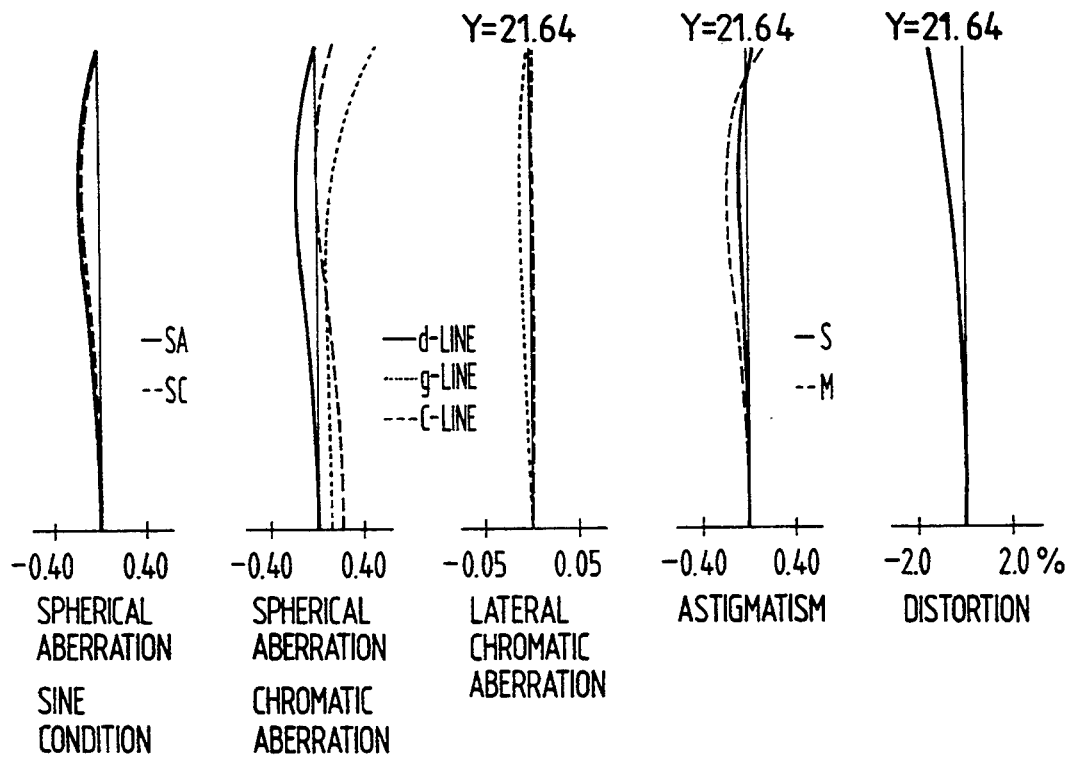

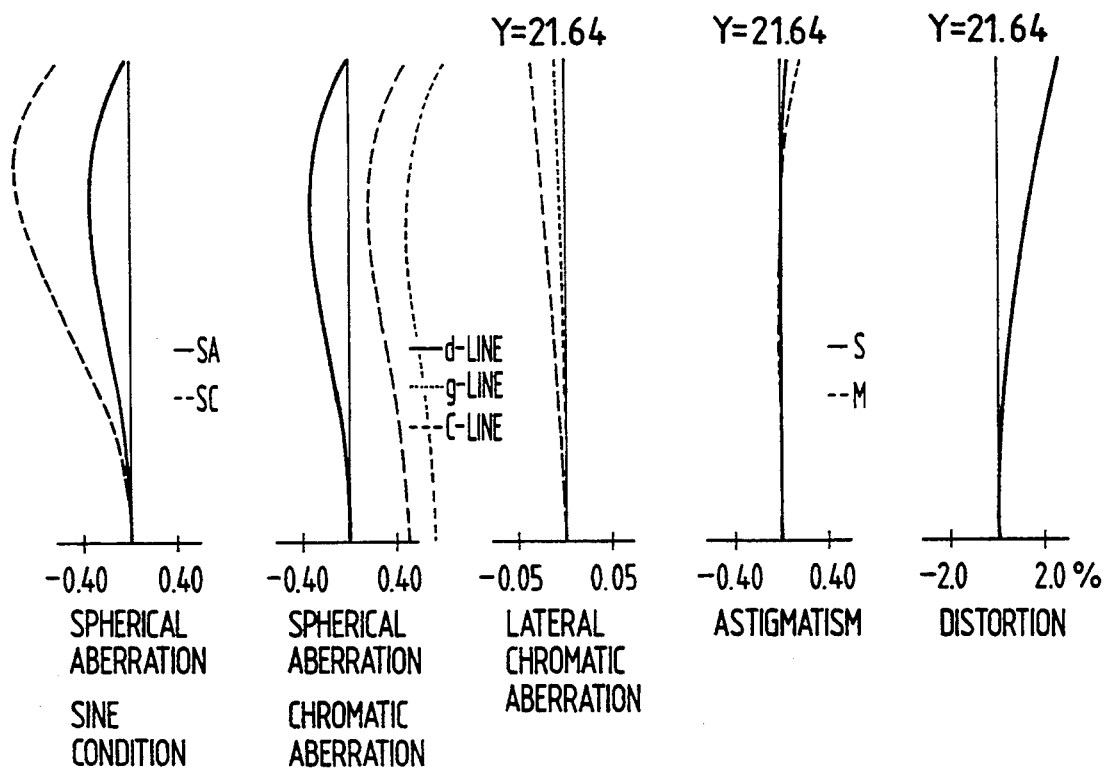
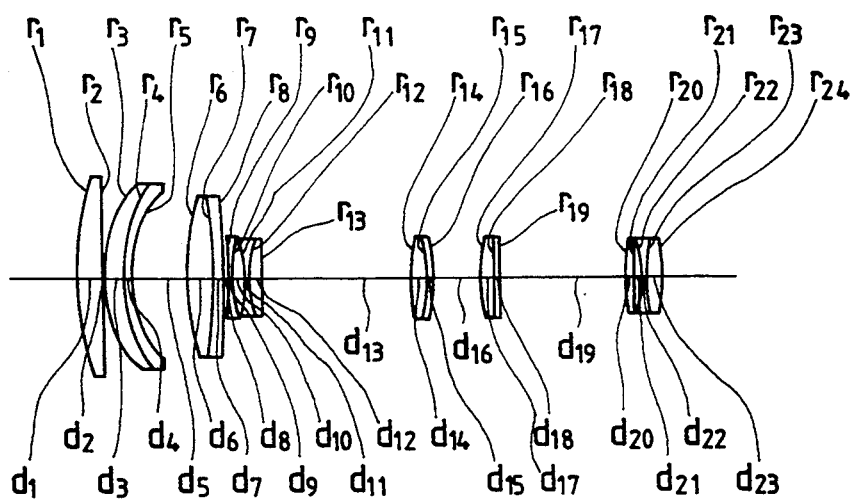

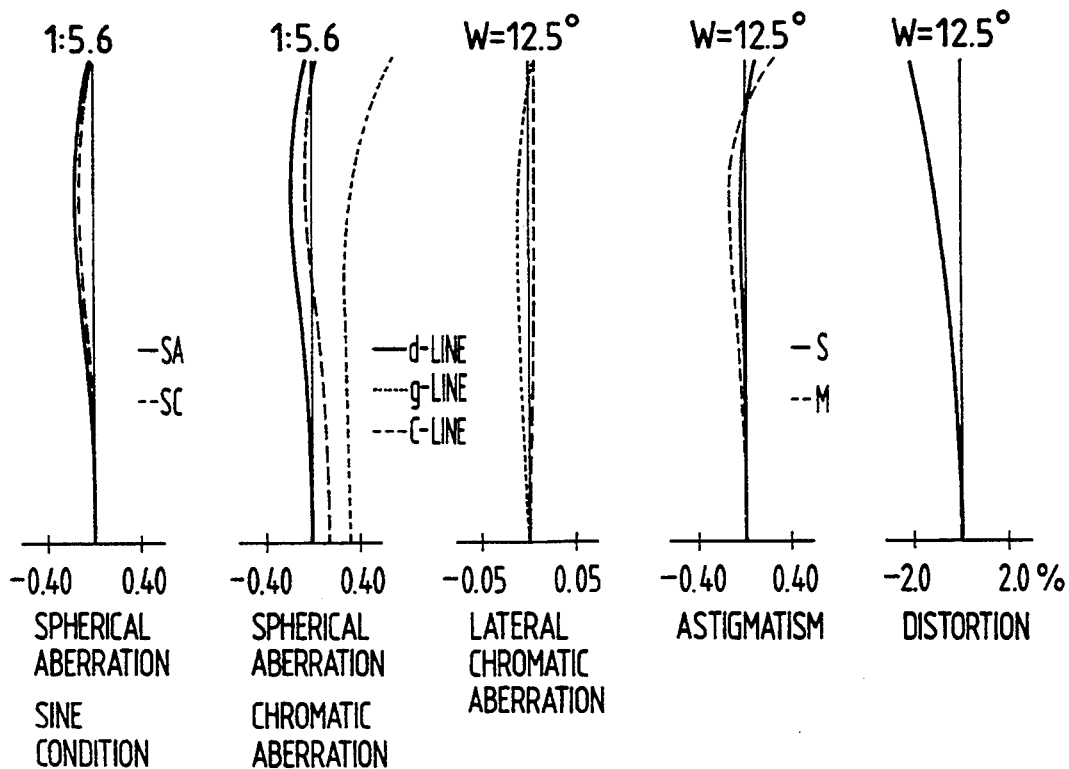
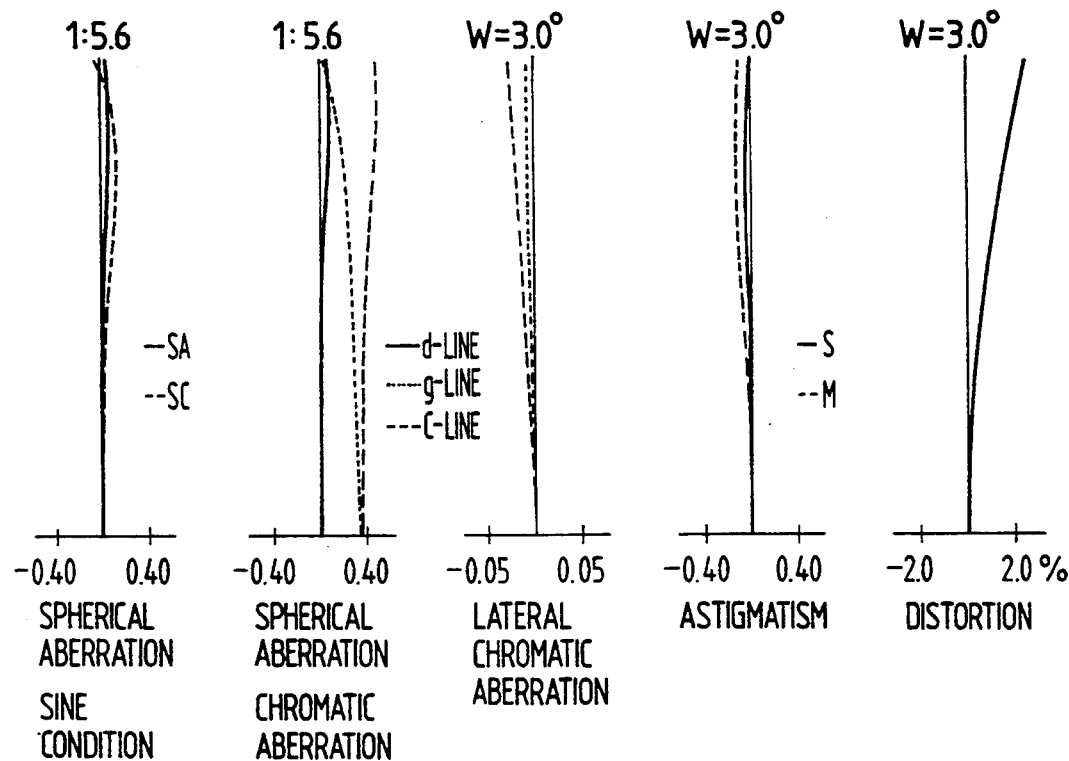

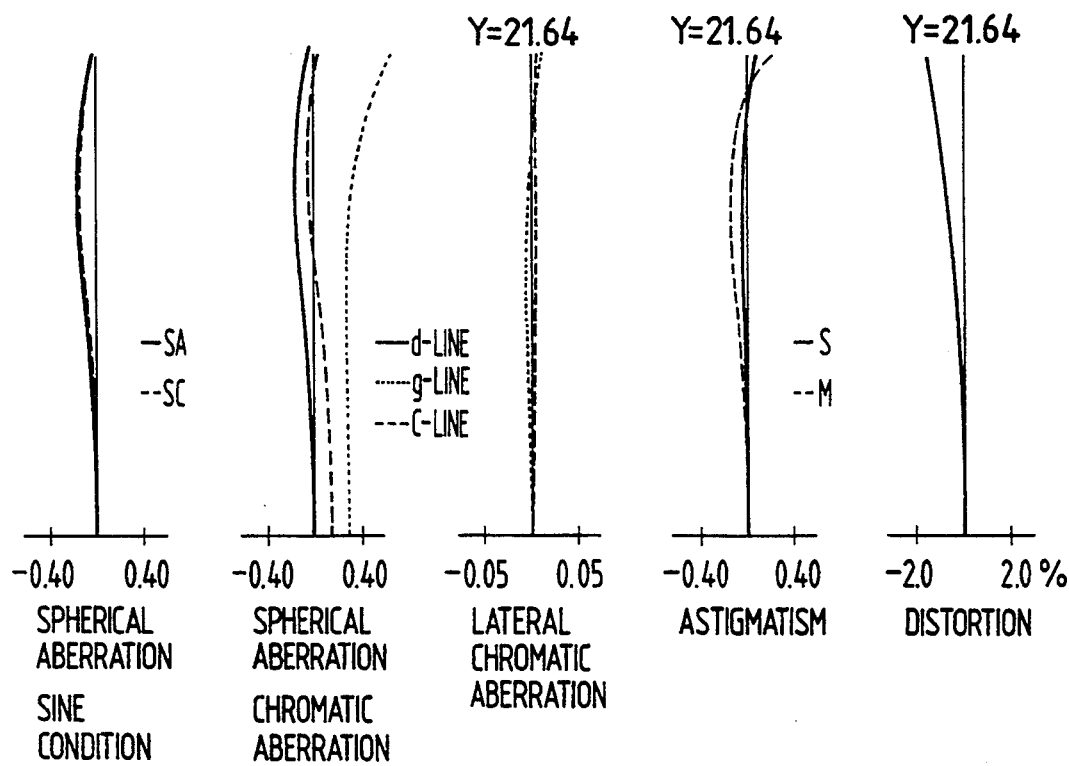
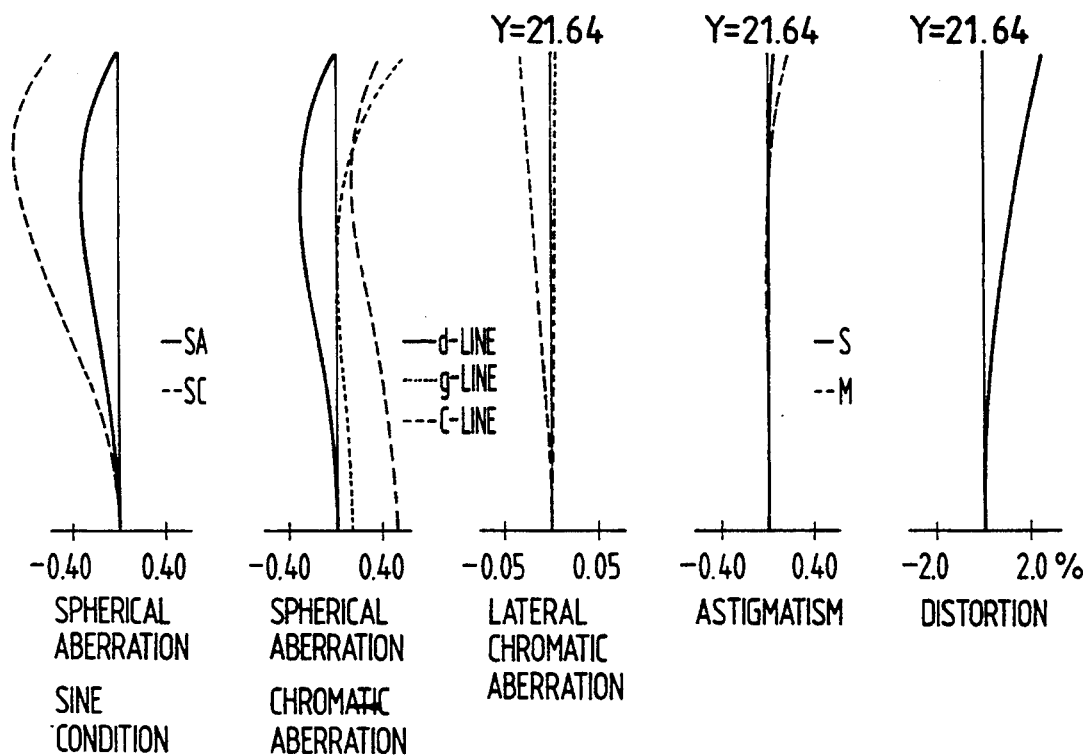

FIG. 27
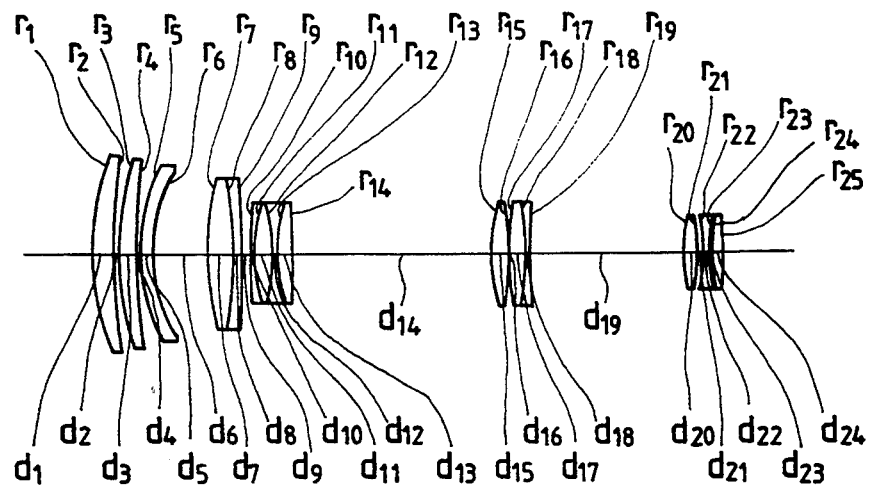
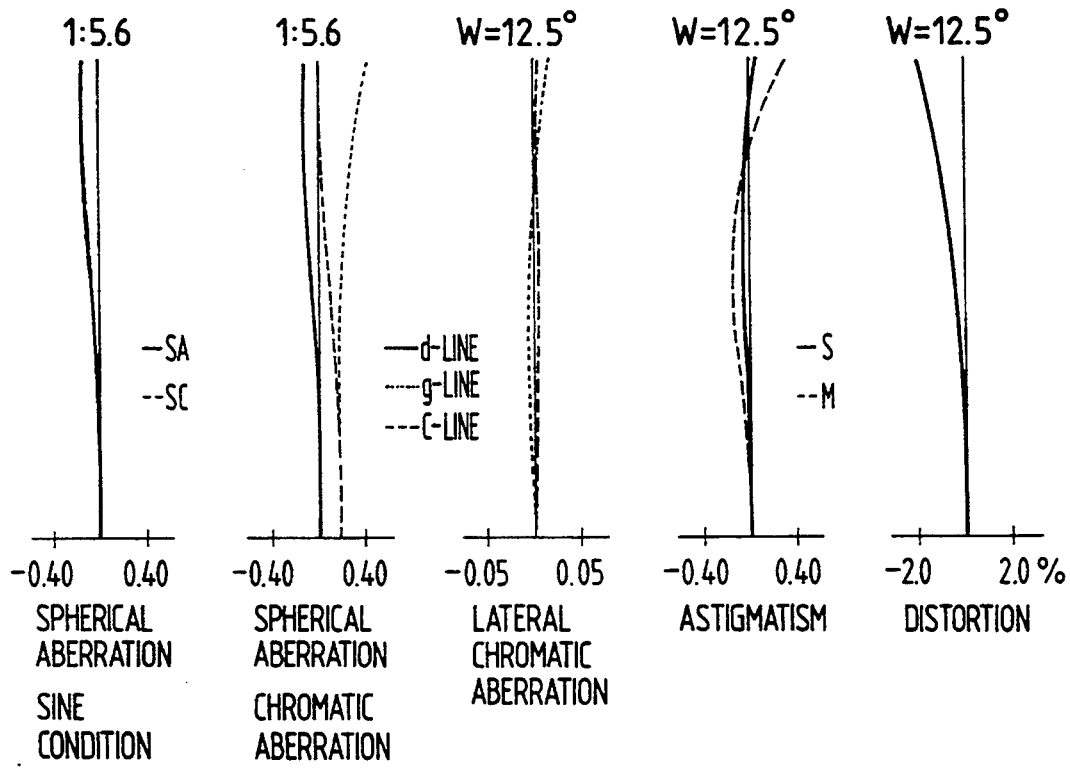
FIG. 28A  FIG. 28B  FIG. 28C  FIG. 28D  FIG. 28E

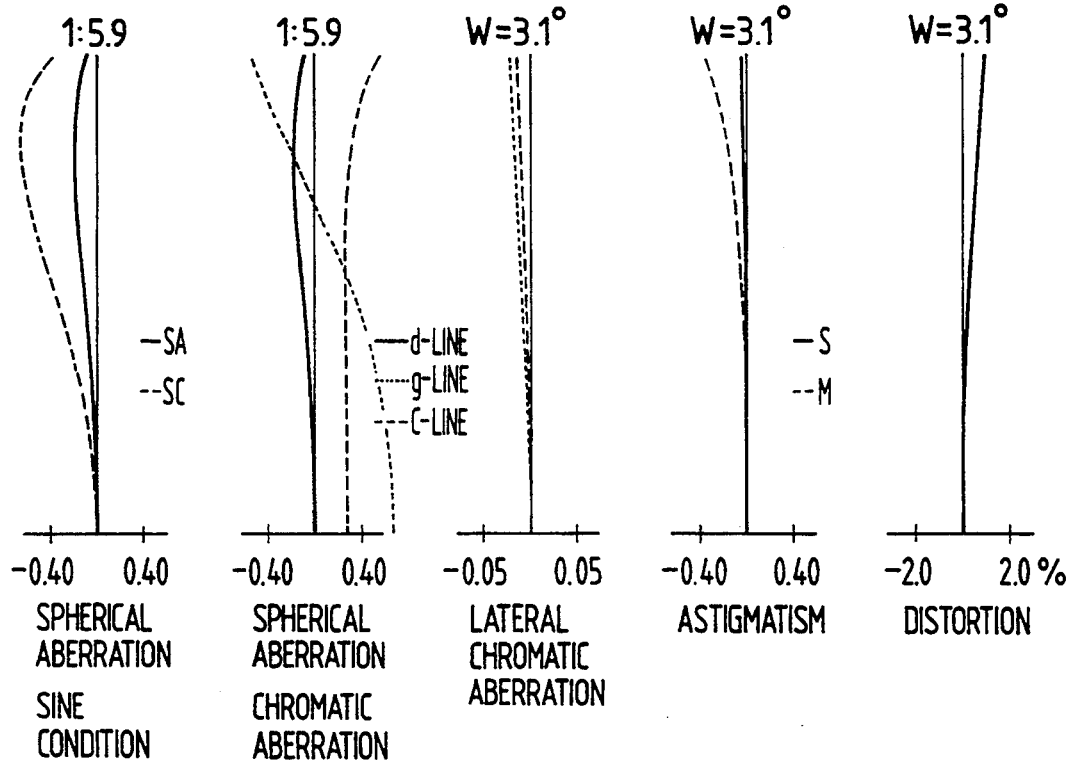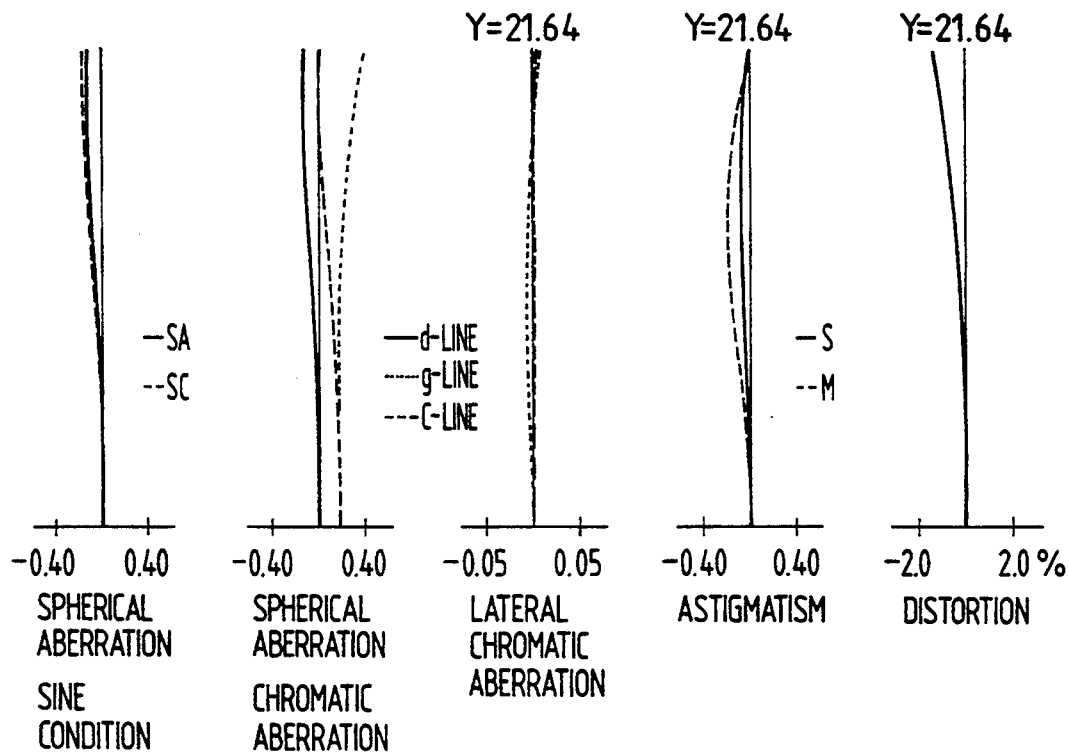

1:2.8

—SA
--SC

SPHERICAL
ABERRATION

SINE
CONDITION

1:2.8

—— d-LINE
······ g-LINE
--- C-LINE

SPHERICAL
ABERRATION

CHROMATIC
ABERRATION

1:2.8

—SA
--SC

SPHERICAL
ABERRATION

SINE
CONDITION

1:2.8

—— d-LINE
······ g-LINE
--- C-LINE

SPHERICAL
ABERRATION

CHROMATIC
ABERRATION

SPHERICAL ABERRATION
SINE CONDITION

SPHERICAL ABERRATION
CHROMATIC ABERRATION

SPHERICAL ABERRATION
SINE CONDITION

SPHERICAL ABERRATION
CHROMATIC ABERRATION

TELEPHOTO ZOOM LENS SYSTEM

BACKGROUND OF THE INVENTION

This application is based on and claims priority from Japanese Patent Application No. HEI 4-185157 filed Jul. 13, 1992, the disclosure of which is incorporated by reference herein.

The present invention relates to a telephoto zoom lens system in which part of the front group is used as a focusing lens group.

As the use of an autofocusing mechanism has spread in recent models of cameras, manufacturers of telephoto lens systems have chosen to employ inner focus lenses of a "non-zoom" type in order to reduce the size and weight of the lens group that moves during focusing.

On the other hand, zoom lens systems commonly rely upon the advancing of the front group for achieving focusing and this focusing method has the advantage that it is substantially free of defocusing due to zooming and that it yet experiences comparatively small aberrational variations also due to zooming. This focusing method is also adopted in telephoto zoom lens systems which have a large aperture. However, the moving lenses in telephoto lens systems of this type have such a large aperture that the lens systems are heavier than telephoto lens systems that employ inner focus lenses. As a result, the focusing ring is too heavy to permit swift movement by rotation. Furthermore, accessories such as a filter and a hood are attached to the foremost end of the lens system and, hence, the weight balance with the change in the length of distance over which the moving lenses are displaced will vary so extensively that the handling quality of the lens system during focusing is not satisfactory.

A further problem with the method of focusing by advancing the front lens component is that the spherical aberration is undercorrected if the lens is focused for a near object at the narrow-angle end and that if the closest focusing distance is shortened, an unsharp image of "soft focus" quality will be produced upon full-aperture shooting.

The zoom lens system described in Japanese Patent Publication (Kokoku) No. SHO 63-58324 is designed according to the specifications F 2.8/80—200 mm and achieves focusing by advancing the front group. The lens portion through which an effective bundle of rays will pass has a volume of about 41 cm$^3$. The layout of lenses in the system is as shown in FIG. 32.

Spherical aberrations that occur when the lens system is focused for an object at infinity with the focal length set at 80 mm are as plotted in FIGS. 33A and 33B; spherical aberrations that occur when the lens system is focused for an object at infinity with the focal length set at 200 mm are as plotted in FIGS. 34A and 34B; spherical aberrations that occur when the lens system is focused for an object 1,500 mm distant with the focal length set at 80 mm are as plotted in FIGS. 35A and 35B; and spherical aberrations that occur when the lens system is focused for an object 1,500 mm distant are as plotted in FIGS. 36A and 36B. Thus, the spherical aberrations that develop when the lens is focused for a near object are greatly undercorrected, particularly at the telephoto end.

Noting these points, the present inventors previously invented a supertelephoto lens system [see Japanese Patent Publication (Kokoku) No. HEI 4-1328] that comprises four lens groups, the first of which was composed of a first sub-group 1a having a positive power, a second sub-group 1b having a negative power and a third sub-group 1c having a positive power. The separation between sub-groups 1a and 1b was sufficient to reduce the diameter of a bundle of rays launching into sub-group 1c, and thereby permitting size reduction of sub-group 1c. Focusing with this system is achieved by moving only sub-group 1c.

The supertelephoto lens system described above successfully provided better handling quality by reducing the weight of the focusing lens group. However, when zooming was effected up to the wide-angle end, such a great vignetting occurred as to cause insufficient aperture efficiency. Hence, the proposal has not been applicable to lens systems that have a half-view angle ω of 20° or more at the wide-angle end.

SUMMARY OF THE INVENTION

An object, therefore, of the present invention is to provide a telephoto zoom lens system in which the wide-angle end starts with the middle telephoto range and which is characterized in that focusing is done by means of a lighter focusing lens group than what is used in the method of focusing by advancing the front group and that only small aberrational variations occur even if focusing is done up to the closest focusing distance.

The above-stated and other objects of the present invention can be attained by a telephoto zoom lens system that comprises a front lens component and rear lens component, the front lens component composed of a front group comprising, in order from the object side, a positive first sub-group 1a and a positive second sub-group 1b and having an overall positive power, the first sub-group 1a being such that a negative meniscus lens having a convex surface directed towards the object is located closest to the image plane, the rear component being located closer to the image plane than the front group and having a zooming capability, focusing for the object being effected by moving only the second sub-group 1b towards the object when it is positioned at near distance, the lens system satisfying the following condition (1):

$$3.00 < (ra1 + ra2)/(ra1 - ra2) < 10.0 \quad (1)$$

where
- ra1: the radius of curvature of the surface on the object side of the negative meniscus lens which is located closest to the image plane in the first sub-group 1a; and
- ra2: the radius of curvature of the surface on the image plane side of the negative meniscus lens which is located closest to the image plane in the first sub-group 1a.

The telephoto zoom lens system may further satisfy the following condition (2):

$$\Sigma d1a/fW < 0.30 \quad (2)$$

where
- $\Sigma d1a$: the sum of the thicknesses of on-axis lenses in sub-group 1a; and
- fW: the focal length of the overall system at the wide-angle end.

The telephoto zoom lens system may further satisfy the following conditions (3) and (4):

$$0.50 < fW/f1 < 1.10 \quad (3)$$

$$0.00 < fW/f1a < 0.50 \qquad (4)$$

where
- fW: the focal length of the overall system at the wide-angle end;
- f1: the focal length of the front lens group; and
- f1a: the focal length of sub-group 1a.

The rear lens component may include, in order from the object side, a negative second group whose principal function is zooming, a positive third group whose principal function is to correct the image position, and a positive fourth group, which lens system performs zooming by moving the second and third group independently of each other.

Alternatively, the rear component may include, in order from the object side, a negative second group and a positive third group, which lens system performs zooming by moving the second and third group independently of each other.

BRIEF DESCRIPTION OF THE DRAWINGS

In the accompanying drawings:

FIGS. 3A–3E are a set of graphs plotting the aberration curves obtained with the same lens system in the case where an object at infinity is taken with the focal length set at 80 mm;

FIGS. 4A–4E are a set of graphs plotting the aberration curves obtained with the same lens system in the case where an object at infinity is taken with the focal length set at 200 mm;

FIGS. 5A–5E are a set of graphs plotting the aberration curves obtained with the same lens system in the case where an object 1,500 mm distant is taken with the focal length set at 80 mm;

FIGS. 6A–6E are a set of graphs plotting the aberration curves obtained with the same lens system in the case where an object 1,500 mm distant is taken with the focal length set at 200 mm;

FIG. 7 is a simplified cross-sectional view showing the telephoto zoom lens system of Example 2 as it is focused for an object at infinity;

FIGS. 8A–8E are a set of graphs plotting the aberration curves obtained with the same lens system in the case where an object at infinity is taken with the focal length set at 80 mm;

FIGS. 9A–9E are a set of graphs plotting the aberration curves obtained with the same lens system in the case where an object at infinity is taken with the focal length set at 200 mm;

FIGS. 10A–10E are a set of graphs plotting the aberration curves obtained with the same lens system in the case where an object 1,500 mm distant is taken with the focal length set at 82 mm;

FIGS. 11A–11E are a set of graphs plotting the aberration curves obtained with the same lens system in the case where an object 1,500 mm distant is taken with the focal length set at 200 mm;

FIG. 12 is a simplified cross-sectional view showing the telephoto zoom lens system of Example 3 as it is focused for an object at infinity;

FIGS. 13A–13E are a set of graphs plotting the aberration curves obtained with the same lens system in the case where an object at infinity is taken with the focal length set at 100 mm;

FIGS. 14A–14E are a set of graphs plotting the aberration curves obtained with the same lens system in the case where an object at infinity is taken with the focal length set at 400 mm;

FIGS. 15A–15E are a set of graphs plotting the aberration curves obtained with the same lens system in the case where an object 2,400 mm distant is taken with the focal length set at 100 mm;

FIGS. 16A–16E are a set of graphs plotting the aberration curves obtained with the same lens system in the case where an object 2,400 mm distant is taken with the focal length set at 400 mm;

FIG. 17 is a simplified cross-sectional view showing the telephoto zoom lens system of Example 4 as it is focused for an object at infinity;

FIGS. 18A–18E are a set of graphs plotting the aberration curves obtained with the same lens system in the case where an object at infinity is taken with the focal length set at 100 mm;

FIGS. 19A–19E are a set of graphs plotting the aberration curves obtained with the same lens system in the case where an object at infinity is taken with the focal length set at 400 mm;

FIGS. 20A–20E are a set of graphs plotting the aberration curves obtained with the same lens system in the case where an object 2,400 mm distant is taken with the focal length set at 100 mm;

FIGS. 21A–21E are a set of graphs plotting the aberration curves obtained with the same lens system in the case where an object 2,400 mm distant is taken with the focal length set at 400 mm;

FIG. 22 is a simplified cross-sectional view showing the telephoto zoom lens system of Example 5 as it is focused for an object at infinity;

FIGS. 23A–23E are a set of graphs plotting the aberration curves obtained with the same lens system in the case where an object at infinity is taken with the focal length set at 100 mm;

FIGS. 24A–24E are a set of graphs plotting the aberration curves obtained with the same lens system in the case where an object at infinity is taken with the focal length set at 400 mm;

FIGS. 25A–25E are a set of graphs plotting the aberration curves obtained with the same lens system in the case where an object 2,400 mm distant is taken with the focal length set at 100 mm;

FIGS. 26A–26E are a set of graphs plotting the aberration curves obtained with the same lens system in the case where an object 2,400 mm distant is taken with the focal length set at 400 mm;

FIG. 27 is a simplified cross-sectional view showing the telephoto zoom lens system of Example 6 as it is focused for an object at infinity;

FIGS. 28A–28E are a set of graphs plotting the aberration curves obtained with the same lens system in the case where an object at infinity is taken with the focal length set at 100 mm;

FIGS. 29A–29E are a set of graphs plotting the aberration curves obtained with the same lens system in the case where an object at infinity is taken with the focal length set at 400 mm;

FIGS. 30A–30E are a set of graphs plotting the aberration curves obtained with the same lens system in the case where an object 2,400 mm distant is taken with the focal length set at 100 mm;

DESCRIPTION OF THE PREFERRED EMBODIMENTS

Figure 1:
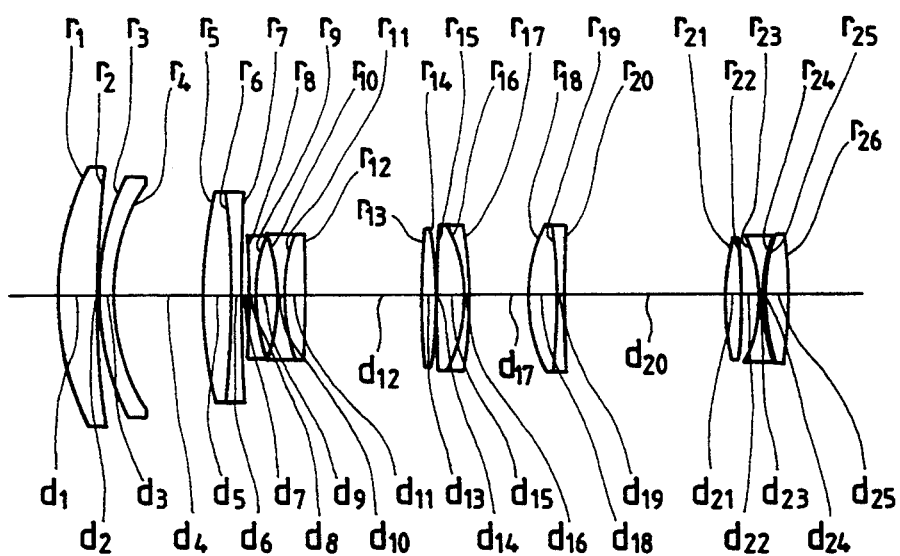
FIG. 1 is a simplified cross-sectional view showing the telephoto zoom lens system of Example 1 as it is focused for an object at infinity.

Embodiments of the telephoto zoom lens system of the present invention are described below with reference to accompanying drawings.

The general features of the system are first described.

Telephoto zoom lens systems are so heavy in lens weight that when they are mounted on the body of a camera, their center of gravity will lie far ahead of the camera; hence, the amount by which the position of the center of gravity is shifted during focusing or zooming will cause substantial effects on the ease of handling the lens system. In the case of systems having a special capability such as auto-focusing or power zooming, an abrupt movement of lenses can potentially cause an accident such as the fall of a tripod.

The zoom lens systems of the examples to be discussed hereunder consist of either four or three lens groups and perform zooming by moving the second and third lens groups which experience only small variations in the position of the center of gravity.

What is more, in order to have the focusing mechanism section completely isolated from the zooming mechanism section (to make the two mechanisms work in a completely independent manner), part of the front (first) lens group (sub-group 1b) is caused to move.

With a view to reducing the size of this sub-group 1b, one may think of designing sub-group 1a as a telephoto focal converter that has a positive lens positioned close to the object and a negative lens close to the image plane. This approach will provide an air space between the positive and negative lenses, causing the entrance pupil of a lens to be shifted towards the image plane. As a result, the size of sub-group 1a which is usually comparable to the diameter of a bundle of rays for the full-aperture F number at the narrow-angle end must be rendered extremely great so as to insure satisfactory marginal illumination at the wide-angle end.

Condition (1) specifies the geometry of the negative meniscus lens in sub-group 1a. If the degree of meniscus of this lens is not high enough to reach the lower limit of condition (1), the height of marginal rays being launched into sub-group 1b will not be effectively lowered. If the upper limit of condition (1) is exceeded, the power of the negative lens at issue becomes so small that it will not be sufficiently effective in correcting chromatic aberrations. Alternatively, the radius of curvature of the negative lens has to be reduced but, then, the aberrations that develop in the exit plane will cause so great effects as to render the manufacture of the complete system difficult to accomplish. Furthermore, the two sub-groups 1a and 1b cannot be made closer to each other on the optical axis and this presents the problem that not only is it difficult to shorten the closeup focusing distance but that the marginal illumination will also decrease.

Sub-group 1b is designed in such a way that the convex surface which lies the closest to the object will nest in the concave surface of sub-group 1a which lies the closest to the image plane. Thus, the range over which group 1b need be displaced during focusing is not very much narrowed and this contributes to a decrease in the overall size of the first lens group.

Furthermore, in order to solve the problem described above, sub-group 1a is designed as consisting of two lenses, plus-minus, with the individual lenses being located sufficiently close to each other so that they satisfy the condition (2). In addition, the negative lens in sub-group 1a which lies closest to the image plane has such a geometry that it creates a meniscus shape that is convex towards the object; as a result, the height of marginal rays to be launched into sub-group 1b is lowered and yet the entrance pupil of that sub-group is prevented from being displaced towards the image plane.

If the condition (2) is not satisfied, insufficiency in marginal illumination will occur in the neighborhood of a focal length at which the variator in the rear component has a magnification of $-1$.

Conditions (3) and (4) must be satisfied if one wants to achieve focusing from infinity to near distance by means of sub-group 1b.

The difference between $(fW/f1)^2$ and $(fW/f1a)^2$ provides focusing sensitivity; therefore, if sub-group 1a has small power whereas the overall power of the first lens group is increased, the focusing sensitivity will increase, making it possible to achieve focusing from infinity to near distance over a narrow range of lens movement.

However, if the power of the first lens group is excessive, its effective F number will decrease, making the system highly susceptible to the development of higher-order aberrations. What is more, the magnification by the zooming section will increase so much as to produce excessive aberrations in the overall system that cannot be effectively corrected.

The negative meniscus lens in sub-group 1a which lies the closest to the image plane is also designed to satisfy the following condition (5) for achieving effective correction of chromatic aberrations that may develop in sub-group 1a:

$$\nu dN < 36 \qquad (5)$$

where $\nu dN$: the Abbe number of the negative meniscus lens.

If the dispersion of the negative lens is so small that the upper limit of condition (5) is exceeded, the chromatic aberrations due to focusing will change greatly enough to deteriorate the quality of the image of a near object for which the system is focused at the narrow-angle end.

If the power of sub-group 1a is unduly small, the aperture of sub-group 1b will increase whereas the aperture efficiency will decrease on account of increasing overall length of the lens system. As for the power of sub-group 1b, it is desirably determined in such a way as to satisfy the following condition (6) for two specific reasons, i.e., to insure that the effective F number of sub-group 1b will not become unduly small and to attain good balance with the focusing sensitivity:

$$0.35 < fW/f1b < 0.70 \quad (6)$$

where
fW: the focal length of the overall system at the wide-angle end; and
f1b: the focal length of sub-group 1b.

EXAMPLE 1

Figure 2:
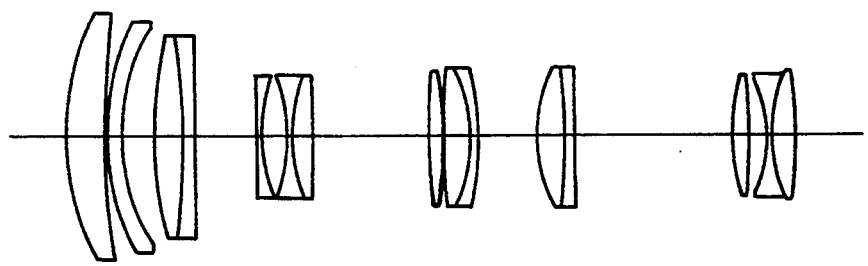
FIG. 2 is a simplified cross-sectional view showing case where the same lens system is focused for an object at the distance 1,500 mm.
Figures 31A, 31B, 31C, 31D, 31E:
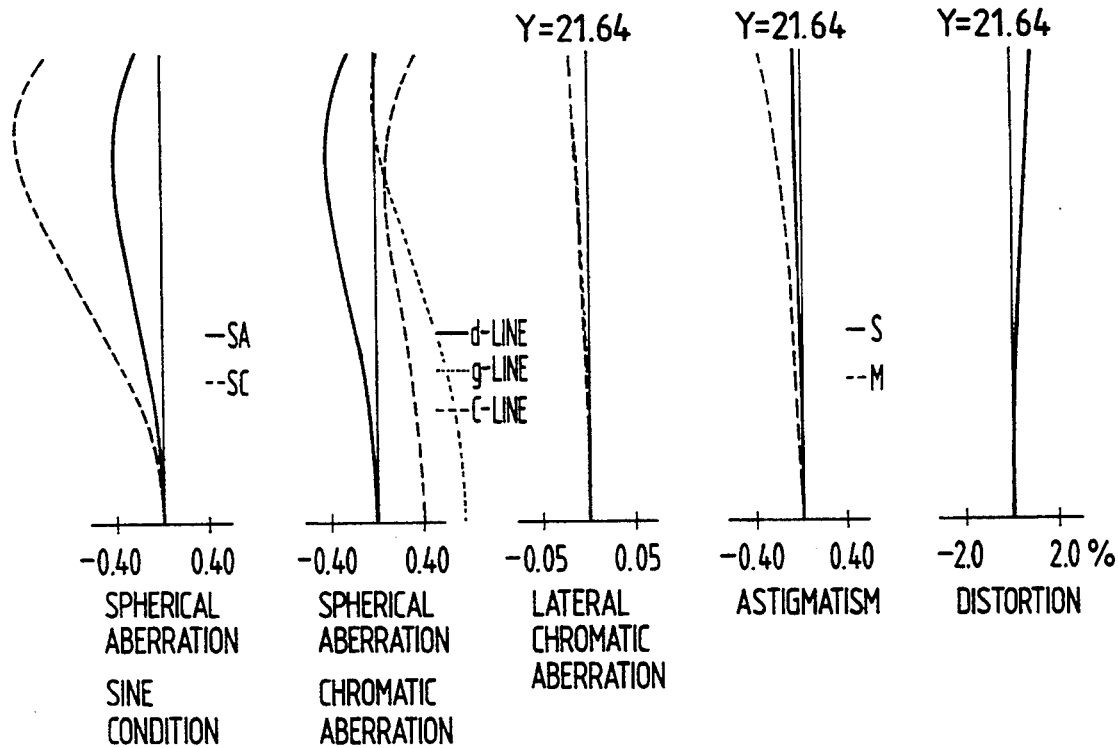
FIGS. 31A-31E are a set of graphs plotting the aberration curves obtained with the same lens system in the case where an object 2,400 mm distant is taken with the focal length set at 400 mm.
Figure 32:
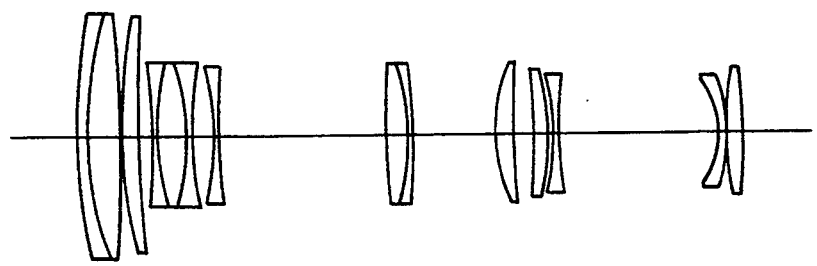
FIG. 32 is a simplified cross-sectional view showing a conventional zoom lens system.
Figure 33A:
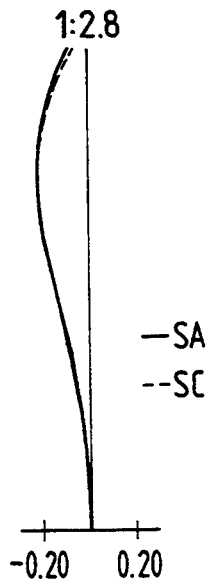
FIGS. 33A and 33B are a set of graphs plotting the aberration curves obtained with the zoom lens system of FIG. 32 as it is focused for an object at infinity with the focal length set at 80 mm.
Figure 33B:
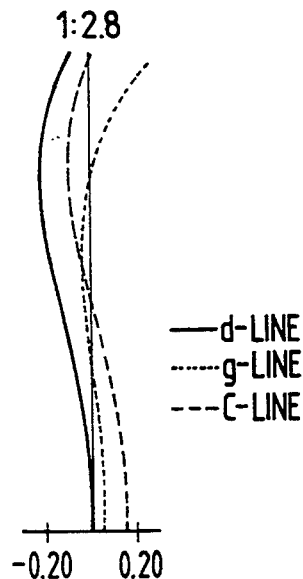
Figure 34A:
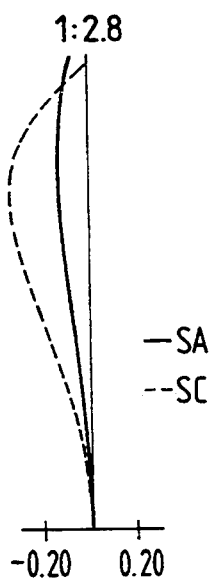
FIGS. 34A and 34B are a set of graphs plotting the aberration curves obtained with the same zoom lens system in the case where an object at infinity is taken with the focal length set at 100 mm.
Figure 34B:
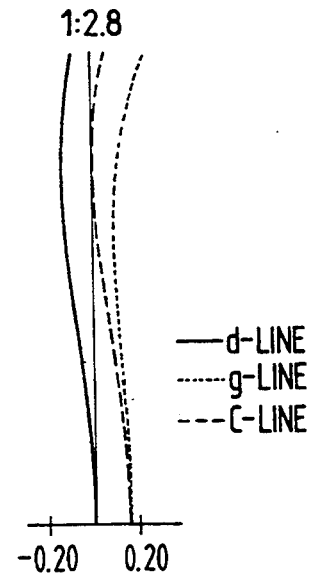
Figure 35A:
FIGS. 35A and 35B are a set of graphs plotting the aberration curves obtained with the same zoom lens system in the case where an object 1,500 mm distant is taken with the focal length set at 80 mm.
Figure 35B:
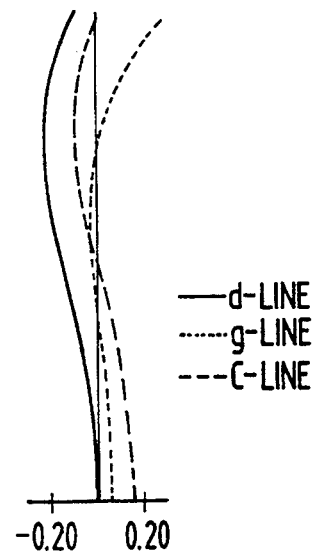
Figure 36A:
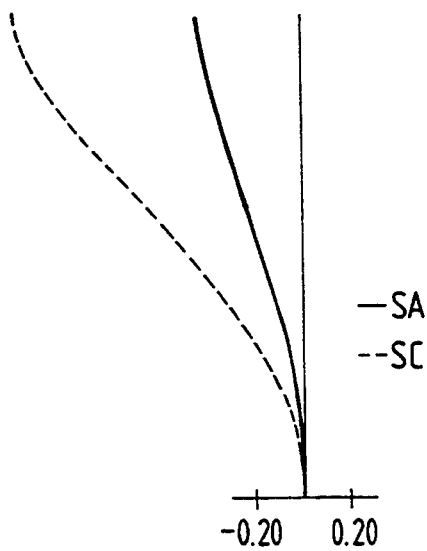
FIGS. 36A and 36B are a set of graphs plotting the aberration curves obtained with the same zoom lens system in the case where an object 1,500 mm distant is taken with the focal length set at 200 mm.
Figure 36B:
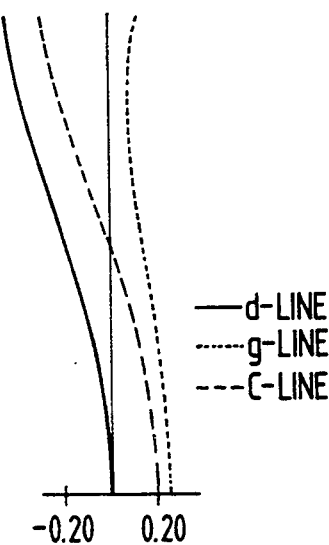

FIG. 1 is a simplified cross-sectional view showing the telephoto zoom lens system of Example 1 as it is focused for an object at infinity, and FIG. 2 is a simplified cross-sectional view showing the case where the same lens system is focused for an object at the distance 1,500 mm. FIGS. 3A to 6D are graphs plotting the aberration curves obtained with the same lens system in various cases: FIGS. 3A-3E refer to the case where an object at infinity is taken with the focal length set at 80 mm; FIGS. 4A-4E refer to the case where an object at infinity is taken with the focal length set at 200 mm; FIGS. 5A-5E refer to the case where an object 1,500 mm distant is taken with the focal length set at 80 mm; and FIGS. 6A-6E refers to the case where an object 1,500 mm distant is taken with the focal length set at 200 mm. Each of FIGS. 3A-3E to 6A-6E plots the following aberrations and parameters: spherical aberration, SA; sine condition, SC; chromatic aberrations expressed in terms of spherical aberrations at the d-, g- and c-lines; lateral chromatic aberration; astigmatism (S, sagittal; M, meridional); and distortion.

Specific numerical data for the system of Example 1 are given in Tables 1 and 2 below, in which: r denotes the radius of curvature; d, the thickness of an individual lens or the air space between lenses; d, the refractive index at the d-line (588 nm); ν, Abbe number; FNo., F number of a lens; f, focal length; fB, back focus; and ω, half view angle.

TABLE 1

| Surface No. | r | d | n | ν |
|---|---|---|---|---|
| 1 | 81.080 | 10.80 | 1.48749 | 70.2 |
| 2 | 284.463 | 0.80 | | |
| 3 | 74.951 | 3.80 | 1.72825 | 28.5 |
| 4 | 57.834 | 26.63 | | |
| 5 | 107.346 | 9.16 | 1.72916 | 54.7 |
| 6 | −253.662 | 3.30 | 1.80518 | 25.4 |
| 7 | 1940.187 | variable | | |
| 8 | −799.043 | 2.00 | 1.77250 | 49.6 |
| 9 | 48.160 | 6.90 | | |
| 10 | −53.740 | 2.00 | 1.69680 | 55.5 |
| 11 | 51.774 | 6.00 | 1.84666 | 23.9 |
| 12 | −677.348 | variable | | |
| 13 | 274.988 | 4.10 | 1.48749 | 70.2 |
| 14 | −129.740 | 0.30 | | |
| 15 | 372.919 | 7.80 | 1.48749 | 70.2 |
| 16 | −45.129 | 2.20 | 1.72047 | 34.7 |
| 17 | −94.598 | variable | | |
| 18 | 44.004 | 8.80 | 1.48749 | 70.2 |
| 19 | −166.830 | 2.20 | 1.76182 | 26.5 |
| 20 | 539.415 | 48.05 | | |
| 21 | 78.676 | 5.00 | 1.67000 | 57.3 |
| 22 | −210.321 | 5.29 | | |
| 23 | −38.285 | 2.10 | 1.77250 | 49.6 |
| 24 | 60.867 | 0.20 | | |
| 25 | 55.728 | 6.54 | 1.80400 | 46.6 |

TABLE 1-continued

| Surface No. | r | d | n | ν |
|---|---|---|---|---|
| 26 | −142.538 | | | |

TABLE 2

| FNo. | 1:2.8 | |
|---|---|---|
| f | 80.00 | 200.00 |
| fB | 45.28 | |
| ω | 15.6 | 6.1 |
| d7 | 1.82 | 42.92 |
| d12 | 35.37 | 4.59 |
| d17 | 18.02 | 7.70 |

EXAMPLE 2

FIG. 7 is a simplified cross-sectional view showing the telephoto zoom lens system of Example 2 for the case where it is focused for an object at infinity. FIGS. 8A-8E to 11A-11E are graphs plotting the aberration curves obtained with the same lens system in various cases; FIGS. 8A-8E refer to the case where an object at infinity is taken with the focal length set at 82 mm; FIGS. 9A-9E refer to the case where an object at infinity is taken with the focal length set at 200 mm; FIGS. 10A-10E refer to the case where an object 1,500 mm distant is taken with the focal length set at 82 mm; and FIGS. 11A-11E refer to the case where an object 1,500 mm distant is taken with the focal length set at 200 mm.

Specific numerical data for the system of Example 2 are given in Tables 3 and 4 below.

TABLE 3

| Surface No. | r | d | n | ν |
|---|---|---|---|---|
| 1 | 105.166 | 9.20 | 1.49700 | 81.6 |
| 2 | 539.065 | 0.60 | | |
| 3 | 98.109 | 4.00 | 1.72825 | 28.5 |
| 4 | 72.975 | 27.00 | | |
| 5 | 120.890 | 9.00 | 1.71300 | 53.8 |
| 6 | −260.958 | 3.30 | 1.80518 | 25.4 |
| 7 | −4240.016 | variable | | |
| 8 | −583.100 | 2.00 | 1.77250 | 49.6 |
| 9 | 59.703 | 6.00 | | |
| 10 | −68.719 | 2.00 | 1.69680 | 55.5 |
| 11 | 57.394 | 5.60 | 1.84666 | 23.8 |
| 12 | −7258.267 | variable | | |
| 13 | 364.441 | 4.00 | 1.69680 | 55.5 |
| 14 | −138.922 | 0.30 | | |
| 15 | 449.689 | 7.00 | 1.64850 | 53.0 |
| 16 | −48.810 | 2.20 | 1.72047 | 34.7 |
| 17 | −309.014 | variable | | |
| 18 | 54.738 | 5.70 | 1.49700 | 81.6 |
| 19 | −897.175 | 0.40 | | |
| 20 | 30.423 | 6.30 | 1.48749 | 70.2 |
| 21 | 118.369 | 2.50 | 1.80518 | 25.4 |
| 22 | 65.559 | 9.50 | | |
| 23 | 97.853 | 3.50 | 1.80400 | 46.6 |
| 24 | 23.714 | 36.50 | | |
| 25 | 56.123 | 6.00 | 1.48749 | 70.2 |
| 26 | −166.084 | | | |

TABLE 4

| FNo. | 1:2.8 | |
|---|---|---|
| f | 82.00 | 200.00 |
| fB | 46.42 | |
| ω | 15.2 | 6.1 |
| d7 | 3.52 | 47.58 |
| d12 | 42.17 | 2.78 |
| d17 | 16.71 | 12.04 |

EXAMPLE 3

FIG. 12 is a simplified cross-sectional view showing the telephoto zoom lens system of Example 3 for the case where it is focused for an object at infinity. FIGS. 13A-13E to 16A-16E are graphs plotting the aberration curves obtained with the same lens system in various cases; FIGS. 13A-13E refer to the case where an object at infinity is taken with the focal length set at 100 mm; FIGS. 14A-14E refer to the case where an object at infinity is taken with the focal length set at 400 mm; FIG. 15A-15E refer to the case where an object 2,400 mm distant is taken with the focal length set at 100 mm; and FIGS. 16A-16E refer to the case where an object 2,400 mm distant is taken with the focal length set at 400 mm.

Specific numerical data for the system of Example 3 are given in Tables 5 and 6 below.

TABLE 5

| Surface No. | r | d | n | ν |
| --- | --- | --- | --- | --- |
| 1 | 129.904 | 6.60 | 1.48749 | 70.2 |
| 2 | 318.452 | 0.80 | | |
| 3 | 71.844 | 9.60 | 1.48749 | 70.2 |
| 4 | 214.556 | 0.80 | | |
| 5 | 84.735 | 3.80 | 1.68893 | 31.1 |
| 6 | 54.895 | 19.82 | | |
| 7 | 95.033 | 10.90 | 1.48749 | 70.2 |
| 8 | −116.643 | 3.30 | 1.60342 | 38.0 |
| 9 | −500.224 | variable | | |
| 10 | −474.527 | 1.80 | 1.77250 | 49.6 |
| 11 | 51.878 | 4.00 | | |
| 12 | −53.307 | 2.00 | 1.69680 | 55.5 |
| 13 | 55.430 | 4.20 | 1.84666 | 23.9 |
| 14 | −453.287 | variable | | |
| 15 | 102.639 | 6.10 | 1.48749 | 70.2 |
| 16 | −41.720 | 2.20 | 1.72047 | 34.7 |
| 17 | −77.120 | variable | | |
| 18 | 51.930 | 4.40 | 1.48749 | 70.2 |
| 19 | 510.371 | 2.20 | 1.76182 | 26.5 |
| 20 | 161.105 | 63.53 | | |
| 21 | 74.719 | 3.20 | 1.60342 | 38.0 |
| 22 | 351.079 | 4.38 | | |
| 23 | −38.483 | 1.80 | 1.77250 | 49.6 |
| 24 | 95.009 | 0.20 | | |
| 25 | 72.034 | 5.60 | 1.53172 | 48.9 |
| 26 | −53.110 | | | |

TABLE 6

| FNo. | 1:5.6 | |
| --- | --- | --- |
| f | 100.00 | 400.00 |
| fB | 65.30 | |
| ω | 12.6 | 3.0 |
| d9 | 2.19 | 43.59 |
| d14 | 79.29 | 3.34 |
| d17 | 10.98 | 45.53 |

EXAMPLE 4

FIG. 17 is a simplified cross-sectional view showing the telephoto zoom lens system of Example 4 for the case where it is focused for an object at infinity. FIGS. 18A-E to 21A-21E are graphs plotting the aberration curves obtained with the same lens system in various cases; FIGS. 18A-18E refer to the case where an object at infinity is taken with the focal length set at 100 mm; FIGS. 19A-19E refer to the case where an object at infinity is taken with the focal length set at 400 mm; FIGS. 20A-20E refer to the case where an object 2,400 mm distant is taken with the focal length set at 100 mm; and FIGS. 21A-21E refer to the case where an object 2,400 mm distant is taken with the focal length set at 400 mm.

Specific numerical data for the system of Example 4 are given in Tables 7 and 8 below.

TABLE 7

| Surface No. | r | d | n | ν |
| --- | --- | --- | --- | --- |
| 1 | 129.622 | 6.80 | 1.48749 | 70.2 |
| 2 | 485.042 | 0.80 | | |
| 3 | 59.601 | 9.10 | 1.48749 | 70.2 |
| 4 | 117.513 | 2.30 | | |
| 5 | 68.058 | 3.80 | 1.80610 | 33.3 |
| 6 | 48.222 | 20.07 | | |
| 7 | 89.413 | 10.20 | 1.48749 | 70.2 |
| 8 | −135.866 | 3.30 | 1.68893 | 31.1 |
| 9 | −473.446 | variable | | |
| 10 | −367.978 | 1.80 | 1.77250 | 49.6 |
| 11 | 49.672 | 3.80 | | |
| 12 | −56.654 | 2.00 | 1.75500 | 52.3 |
| 13 | 34.364 | 4.30 | 1.84666 | 23.9 |
| 14 | 317.867 | variable | | |
| 15 | 105.947 | 5.80 | 1.48749 | 70.2 |
| 16 | −35.577 | 2.20 | 1.80610 | 33.3 |
| 17 | −58.808 | variable | | |
| 18 | 44.742 | 4.70 | 1.48749 | 70.2 |
| 19 | −231.236 | 2.20 | 1.76182 | 26.5 |
| 20 | 672.066 | 46.08 | | |
| 21 | 71.116 | 3.30 | 1.56732 | 42.8 |
| 22 | −452.605 | 2.86 | | |
| 23 | −40.754 | 1.90 | 1.77250 | 49.6 |
| 24 | 51.699 | 4.90 | 1.57309 | 42.6 |
| 25 | −74.090 | | | |

TABLE 8

| FNo. | 1:5.6 | |
| --- | --- | --- |
| f | 100.00 | 400.00 |
| fB | 74.83 | |
| ω | 12.5 | 3.0 |
| d9 | 2.23 | 47.88 |
| d14 | 50.85 | 3.05 |
| d17 | 19.51 | 21.66 |

EXAMPLE 5

FIG. 22 is a simplified cross-sectional view showing the telephoto zoom lens system of Example 5 for the case where it is focused for an object at infinity. FIGS. 23A-E to 26A-E are graphs plotting the aberration curves obtained with the same lens system in various cases; FIGS. 23A-23E refer to the case where an object at infinity is taken with the focal length set at 100 mm; FIGS. 24A-24E refer to the case where an object at infinity is taken with the focal length set at 400 mm; FIGS. 25A-25E refer to the case where an object 2,400 mm distant is taken with the focal length set at 100 mm; and FIGS. 26A-26E refer to the case where an object 2,400 mm distant is taken with the focal length set at 400 mm.

Specific numerical data for the system of Example 5 are given in Tables 9 and 10 below.

TABLE 9

| Surface No. | r | d | n | ν |
| --- | --- | --- | --- | --- |
| 1 | 111.080 | 9.00 | 1.49700 | 81.6 |
| 2 | 958.200 | 0.80 | | |
| 3 | 48.825 | 6.86 | 1.48749 | 70.2 |
| 4 | 57.041 | 3.20 | 1.75520 | 27.5 |
| 5 | 44.602 | 20.77 | | |
| 6 | 90.766 | 10.20 | 1.48749 | 70.2 |
| 7 | −164.417 | 3.30 | 1.72047 | 34.7 |
| 8 | −578.755 | variable | | |
| 9 | −286.640 | 1.80 | 1.77250 | 49.6 |

TABLE 9-continued

| Surface No. | r | d | n | ν |
|---|---|---|---|---|
| 10 | 60.883 | 3.80 | | |
| 11 | −69.086 | 2.00 | 1.75500 | 52.3 |
| 12 | 32.632 | 4.30 | 1.84666 | 23.9 |
| 13 | 170.112 | variable | | |
| 14 | 106.870 | 5.80 | 1.48749 | 70.2 |
| 15 | −38.112 | 2.20 | 1.80610 | 33.3 |
| 16 | −63.106 | variable | | |
| 17 | 43.544 | 4.70 | 1.48749 | 70.2 |
| 18 | −278.882 | 2.20 | 1.76182 | 26.5 |
| 19 | 349.224 | 47.10 | | |
| 20 | 63.953 | 3.30 | 1.56732 | 42.8 |
| 21 | −311.082 | 2.69 | | |
| 22 | −42.664 | 1.90 | 1.77250 | 49.6 |
| 23 | 48.917 | 4.90 | 1.58144 | 40.8 |
| 24 | −110.707 | | | |

TABLE 10

| FNo. | 1:5.6 | |
|---|---|---|
| f | 100.00 | 400.00 |
| fB | 73.23 | |
| ω | 12.5 | 3.0 |
| d8 | 2.12 | 49.47 |
| d13 | 56.70 | 2.93 |
| d16 | 18.77 | 25.19 |

EXAMPLE 6

FIG. 27 is a simplified cross-sectional view showing the telephoto zoom lens system of Example 6 for the case where it is focused for an object at infinity. FIGS. 28A–E to 31A–E are graphs plotting the aberration curves obtained with the same lens system in various cases; FIGS. 28A–28E refer to the case where an object at infinity is taken with the focal length set at 100 mm; FIGS. 29A–29E refer to the case where an object at infinity is taken with the focal length set at 400 mm; FIGS. 30A–30E refer to the case where an object 2,400 mm distant is taken with the focal length set at 100 mm; and FIGS. 31A–31E refer to the case where an object 2,400 mm distant is taken with the focal length set at 400 mm.

Specific numerical data for the system of Example 6 are given in Tables 11 and 12 below.

TABLE 11

| Surface No. | r | d | n | ν |
|---|---|---|---|---|
| 1 | 91.000 | 8.00 | 1.48749 | 70.2 |
| 2 | 251.125 | 1.80 | | |
| 3 | 109.005 | 6.40 | 1.49700 | 81.6 |
| 4 | 236.662 | 1.80 | | |
| 5 | 68.537 | 4.00 | 1.80518 | 25.4 |
| 6 | 54.198 | 20.25 | | |
| 7 | 96.607 | 9.80 | 1.48749 | 70.2 |
| 8 | −161.961 | 3.30 | 1.69895 | 30.1 |
| 9 | −543.851 | variable | | |
| 10 | 211.702 | 1.80 | 1.72916 | 54.7 |
| 11 | 48.606 | 6.40 | | |
| 12 | −53.796 | 2.00 | 1.69680 | 55.5 |
| 13 | 51.158 | 5.20 | 1.84666 | 23.8 |
| 14 | 513.925 | variable | | |
| 15 | 72.961 | 5.30 | 1.55963 | 61.2 |
| 16 | −197.550 | 0.10 | | |
| 17 | 58.433 | 7.00 | 1.51633 | 64.1 |
| 18 | −85.532 | 2.20 | 1.80518 | 25.4 |
| 19 | 532.841 | 57.42 | | |
| 20 | 62.071 | 4.20 | 1.56732 | 42.8 |
| 21 | −132.498 | 2.96 | | |
| 22 | −42.229 | 2.00 | 1.77250 | 49.6 |
| 23 | 47.953 | 0.50 | | |
| 24 | 42.779 | 4.50 | 1.61293 | 37.0 |

TABLE 11-continued

| Surface No. | r | d | n | ν |
|---|---|---|---|---|
| 25 | 4924.700 | | | |

TABLE 12

| FNo. | 1:5.6 | 5.9 |
|---|---|---|
| f | 100.05 | 400.00 |
| fB | 46.90 | 94.88 |
| ω | 12.5 | 3.1 |
| d9 | 3.33 | 28.98 |
| d14 | 77.09 | 3.46 |

Table 13 list values that satisfy conditions (1) to (6) in each of Examples 1 to 6, as well as the effective lens volume of each Example.

TABLE 13

| Condition | Ex. 1 | Ex. 2 | Ex. 3 | Ex. 4 | Ex. 5 | Ex. 6 |
|---|---|---|---|---|---|---|
| (1) | 7.75 | 6.80 | 4.67 | 5.86 | 8.17 | 8.55 |
| (2) | 0.193 | 0.168 | 0.216 | 0.228 | 0.198 | 0.220 |
| (3) | 0.586 | 0.555 | 0.752 | 0.754 | 0.731 | 0.766 |
| (4) | 0.168 | 0.131 | 0.315 | 0.324 | 0.310 | 0.360 |
| (5) | 28.5 | 28.5 | 31.1 | 33.3 | 27.5 | 25.4 |
| (6) | 0.488 | 0.470 | 0.532 | 0.541 | 0.519 | 0.501 |
| volume (in cm$^3$) | ca. 23 | ca. 25 | ca. 24 | ca. 21 | ca. 22 | ca. 20 |

As described on the foregoing pages, according to the present invention, the lens group to be moved during zooming is isolated from the lens group that is to be moved for focusing and focus is achieved by moving sub-group 1b on the image plane side of the first lens group which is located closer to the object than the lens group that is to be moved during zooming. As a result, zooming can be accomplished without causing defocusing while, at the same time, focus can be done using a lens group that weighs about one half the weight of the focusing group used in the conventional system that performs focusing by advancing the front group. The zoom lens system of the present invention thus permits satisfactory aperture efficiency to be provided even at the wide-angle end and, furthermore, it experiences less variations in spherical aberration over the shooting range from infinity to near distance even at the narrow-angle end. In addition, the focusing lens group and the zooming lens group in the system of the present invention are mechanistically independent of each other and the aperture of the variator group also decreases as the focusing lens group becomes smaller. Hence, the lens system of the invention is particularly suitable for operation by power zooming which is accomplished with a built-in motor.

We claim:

1. A telephoto zoom lens system that comprises a front component and a rear component, said front component composed of a first lens group comprising, in order from the object side, a positive first sub-group 1a and a positive second sub-group 1b and having an overall positive power, said first sub-group 1a being such that a negative meniscus lens having a convex surface directed towards said object is located the closest to the image plane, said rear component being located closer to the image plane than said first group and having a zooming capability, focusing for said object being effected by moving only said second sub-group 1b towards said object when it is positioned at near distance, said lens system satisfying the following condition (1):

$$3.00 < (ra1 + ra2)/(ra1 - ra2) < 10.0 \quad (1)$$

where
- ra1: the radius of curvature of the surface on the object side of the negative meniscus lens which is located the closest to the image plane in the first sub-group 1a; and
- ra2: the radius of curvature of the surface on the image plane side of the negative meniscus lens which is located the closest to the image plane in the first sub-group 1a.

2. A telephoto zoom lens system according to claim 1, which further satisfies the following condition (2):

$$\Sigma d1a/fW < 0.30 \quad (2)$$

where
- $\Sigma d1a$: the sum of the thicknesses of on-axis lenses in sub-group 1a; and
- fW: the focal length of the overall system at the wide-angle end.

3. A telephoto zoom lens system according to claim 1, which further satisfies the following conditions (3) and (4):

$$0.50 < fW/f1 < 1.10 \quad (3)$$

$$0.00 < fW/f1a < 0.50 \quad (4)$$

where
- fW: the focal length of the overall system at the wide-angle end;
- f1: the focal length of the first lens group; and
- f1a: the focal length of sub-group 1a.

4. A telephoto zoom lens system according to claim 2, which further satisfies the following conditions (3) and (4):

$$0.50 < fW/f1 < 1.10 \quad (3)$$

$$0.00 < fW/f1a < 0.50 \quad (4)$$

where
- fW: the focal length of the overall system at the wide-angle end;
- f1: the focal length of the first lens group; and
- f1a: the focal length of sub-group 1a.

5. A telephoto zoom lens system according to claim 1, wherein said rear component comprises, in order from the object side, a negative second group whose principal function is zooming, a positive third group whose principal function is to correct the image position, and a positive fourth group, wherein said lens system performs zooming by moving said second and third groups independently of each other.

6. A telephoto zoom lens system according to claim 2, wherein said rear component comprises, in order from the object side, a negative second group whose principal function is zooming, a positive third group whose principal function is to correct the image position, and a positive fourth group, wherein said lens system performs zooming by moving said second and third groups independently of each other.

7. A telephoto zoom lens system according to claim 3, wherein said rear component comprises, in order from the object side, a negative second group whose principal function is zooming, a positive third group whose principal function is to correct the image position, and a positive fourth group, wherein said lens system performs zooming by moving said second and third groups independently of each other.

8. A telephoto zoom lens system according to claim 4, wherein said rear component comprises, in order from the object side, a negative second group whose principal function is zooming, a positive third group whose principal function is to correct the image position, and a positive fourth group, wherein said lens system performs zooming by moving said second and third groups independently of each other.

9. A telephoto zoom lens system according to claim 1, wherein said rear component comprises, in order from the object side, a negative second group and a positive third group, wherein said lens system performs zooming by moving said second and third groups independently of each other.

10. A telephoto zoom lens system according to claim 2, wherein said rear component comprises, in order from the object side, a negative second group and a positive third group, wherein said lens system performs zooming by moving said second and third groups independently of each other.

11. A telephoto zoom lens system according to claim 3, wherein said rear component comprises, in order from the object side, a negative second group and a positive third group, wherein said lens system performs zooming by moving said second and third groups independently of each other.

12. A telephoto zoom lens system according to claim 4, wherein said rear component comprises, in order from the object side, a negative second group and a positive third group, wherein said lens system performs zooming by moving said second and third groups independently of each other.

13. A telephoto zoom lens system according to claim 1, further satisfying the following condition (5):

$$\nu dN < 36 \quad (5)$$

where
- $\nu dN$: the Abbe number of the negative meniscus lens.

14. A telephoto zoom lens system according to claim 1, further satisfying the following condition (6):

$$0.35 < fW/f1b < 0.70 \quad (6)$$

where
- fW: the focal length of the overall system at the wide-angle end; and
- f1b: the focal length of sub-group 1b.

* * * * *